US007653793B1

(12) United States Patent
Garthwaite

(10) Patent No.: US 7,653,793 B1
(45) Date of Patent: Jan. 26, 2010

(54) USE OF MEMORY PROTECTION TO IMPLEMENT REPLICATING COLLECTION IN AN INCREMENTAL, COPYING GARBAGE COLLECTOR

(75) Inventor: Alexander T. Garthwaite, Beverly, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 1233 days.

(21) Appl. No.: 10/991,148

(22) Filed: Nov. 17, 2004

(51) Int. Cl.
*G06F 13/00* (2006.01)
(52) U.S. Cl. .................. 711/159; 717/135; 717/150
(58) Field of Classification Search ............. 711/159; 717/135, 150
See application file for complete search history.

(56) References Cited

U.S. PATENT DOCUMENTS 5,088,036 A * 2/1992 Ellis et al. .................. 707/206

(Continued)

FOREIGN PATENT DOCUMENTS

WO  WO01 88713 A2  11/2001

OTHER PUBLICATIONS

Jones and Lins, Garbage Collection: Algorithms for Automatic Dynamic Memory Management, 1996, Wiley, New York.
Paul Wilson, Uniprocessor Garbage Collection Techniques, 1994, pp. 1-67, Technical Report, University of Texas.
Hudson and Moss, Incremental Collection of Mature Objects, Proceedings of the International Workshop on Memory Management, 1992, Springer-Verlag.

(Continued)

*Primary Examiner*—Reba I Elmore
(74) *Attorney, Agent, or Firm*—Osha•Liang LLP

(57) ABSTRACT

An incremental collector can include memory pages, preferably virtual memory (VM) pages containing objects. A bit or byte map is created with one entry corresponding to each VM page. The VM page being collected is first write-protected and then the reachable objects are copied or relocated. Application induced changes to objects that have already been relocated are flagged in the map. Later the collector will suspend the application, scan the map and update the relocated objects that were changed and update the references to these objects. In one embodiment aimed at concurrent collecting, the map is copied to a second map, and the second map is scanned for changes that are propagated as before. The application may be suspended on the last pass through the map for the updating of remaining relocated objects by scanning the first map. The incremental collector can be a Train algorithm.

28 Claims, 23 Drawing Sheets

U.S. PATENT DOCUMENTS

| | | | |
|---|---|---|---|
| 5,819,304 A * | 10/1998 | Nilsen et al. ................... | 711/5 |
| 5,848,423 A | 12/1998 | Ebrahim et al. | |
| 6,148,309 A | 11/2000 | Azagury et al. | |
| 6,148,310 A | 11/2000 | Azagury et al. | |
| 6,173,294 B1 | 1/2001 | Azagury et al. | |
| 6,185,581 B1 | 2/2001 | Garthwaite | |
| 6,415,302 B1 | 7/2002 | Garthwaite et al. | |
| 6,424,977 B1 | 7/2002 | Garthwaite | |
| 6,434,576 B1 | 8/2002 | Garthwaite | |
| 6,434,577 B1 | 8/2002 | Garthwaite | |
| 6,449,626 B1 | 9/2002 | Garthwaite et al. | |
| 6,529,919 B1 | 3/2003 | Agesen et al. | |
| 6,574,720 B1 | 6/2003 | Hopeman et al. | |
| 6,826,583 B1 | 11/2004 | Flood et al. | |
| 6,868,488 B2 | 3/2005 | Garthwaite | |
| 7,058,929 B2 * | 6/2006 | Charnell et al. ............. | 717/135 |
| 2006/0179086 A1 * | 8/2006 | Najork et al. ............... | 707/204 |

OTHER PUBLICATIONS

Grarup and Seligman, Incremental Mature Garbage Collection, Aarhus University, Computer Science Department, 1993.

Seligman and Grarup, Incremental Mature Garbage Collection Using the Train Algorithm, Aarhus Unuversity, Computer Science Department.

Henry Baker, List Processing in Real Time on a Serial Computer, 1978, Communications of the ACM 21.

Scott Nettles and James O'Toole, Real-Time Replication Garbage Collection, 1993, PDDI.

Andrew Appel et al. Real-Time Concurrent Collection on Stock Multiprocessors, 1988, ACM Sigplan.

Rodney Brooks, Trading Data Space for Reduced Time and Code Space in Real-Time Garbage Collection on Stock Hardware, 1984, ACM pp. 256-262.

Richard Hudson and J. Eliot Moss, Sapphire: Copying GC Without Stopping the World, 2001, Java Grande/ISCOPE.

Maurice Herlihy and J. Eliot Moss, Lock-Free Garbage Collection for Multiprocessors 1991, ACM, pp. 229-236.

Appel, "Simple Generational Garbage Collection and Fast Allocation", Software Practice and Experience, 19(2), 1989, 171-183.

Arora, et al., "Thread Scheduling for Multiprogrammed Multiprocessors", Proceedings of the 10th Annual ACM Symposium on Parallel Algorithms and Architecture, Jun. 1998.

Bacon, et al., "Java without the Coffee Breaks: A nonintrusive Multiprocessor Garbage Collector", SIGPLAN Conference on Programming Language Design and Implementation, Jun. 2001, Snowbird, UT.

Chilimbi, et al., "Using Generational Garbage Collection to Implement Cache-Conscious Data Placement", International Symposium on Memory Management, Oct. 1998.

Clark, "An Efficient List-Moving Algorithm Using Constant Workspace, vol. 19 No. 6", Communications of the ACM, Jun. 1976, 352-354.

Clark, et al., "Compacting Garbage Collection can be Fast and Simple", Software-Practice and Experience, vol. 26, No. 2, Feb. 1996, 177-194.

Courts, "Improving Locality of Reference in a Garbage-Collecting Memory Management System", Communications of the ACM, vol. 31, No. 9, Sep. 1988, 1128-1138.

Goldstein, et al., "Lazy Threads: Implementing a Fast Parallel Call, vol. 37, No. 1", Journal of Parallel and Distributed Computing, Aug. 1996, 5-20.

Harris, "Dynamic Adaptive Pre-Tenuring", In Proceedings of the Int'l Symposium on Memory Management, Oct. 2000, 127-136.

Hosking, et al., "Remembered Sets Can Also Play Cards", OOPSLA/ECOOP Workshop on Garbage Collection in Object-Oriented Systems, Oct. 1993.

Hosking, et al., "Protection Traps and Alternatives for Memory Management of an Object-Oriented Language", Object Systems Laboratory, Dec. 1993, 1-14, Dept. Of Comp. Sci., Amherst, MA.

Hudson, et al., "Adaptive Garbage Collection for Modula-3 and Small Talk", OOPSLA.ECOOP '90 Workshop on Garbage Collection in Object-Oriented Systems, Oct. 27, 1990.

Lieberman, et al., "A Real-Time Garbage Collector Based on the Lifetimes of Objects", Communications of the ACM, 1983, 26(6).

Moon, "Garbage Collection in a Large Lisp System", Conference Record of the 1984 ACM Symposium on LISP and Functional Programming, Aug. 1984, 235-246, Austin, TX.

Sobalvarro, "A Lifetime-based Garbage Collector for LISP Systems on General-Purpose Computers", Department of Electrical Engineering and Computer Science at MIT, Sep. 1988, AITR-1417.

Stamos, "Static Grouping of Small Objects to Enhance Performance of a Paged Virtual Memory", ACM Transactions on Computer Systems, vol. 2, No. 2, May 1984, 155-180.

Ungar, "Generation Scavenging: A Non-Disruptive High Performance Storage Reclaration Algorithm", ACM SIGPLAN Notices, Apr. 1984, 19(5).

Cheney, "A Nonrecursive List Compacting Algorithm, vol. 13, No. 11", Communications of the ACM, Nov. 1970, 677-678, Uni. Math. Lab., Cambridge, European Patent Office.

Hosking, et al., "A Comparative Performance Evaluation of Write Barrier Implementations", OOPSLA; ACM Conference on Object-Oriented Systems, Languages and Applications, Oct. 1992, V. 27(10), ACM Press, Vancouver, Canada.

Lam, et al., "Object Type Directed Garbage Collection to Improve Locality", Proceedings of the International Workshop on Memory Management, Sep. 1992, 404-425, St. Malo, France.

Wilson, et al., "Effective Static-Graph Reorganization to Improve Locality in Garbage Collected Systems", Proceedings of ACM SIGPLAN Conference on Programming Language Design and Implementation, Jun. 1991, Canada.

* cited by examiner

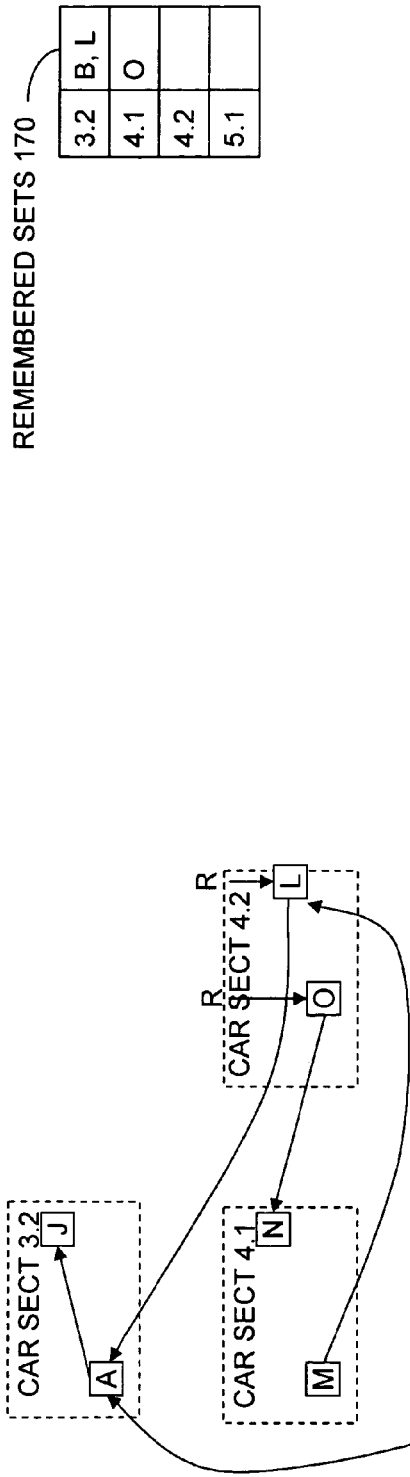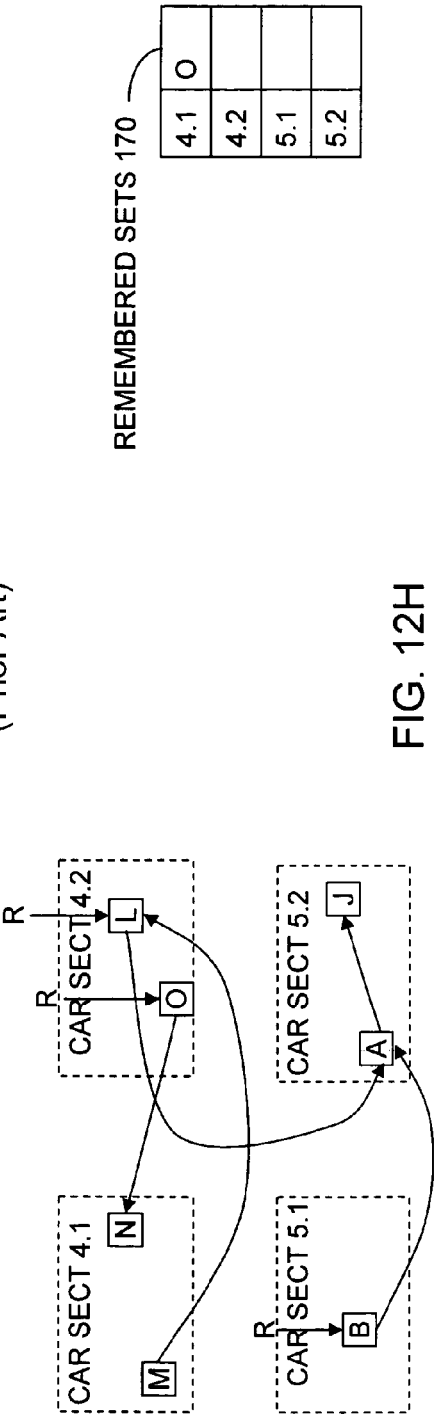
FIG. 12G
(Prior Art)
FIG. 12H
(Prior Art)

USE OF MEMORY PROTECTION TO IMPLEMENT REPLICATING COLLECTION IN AN INCREMENTAL, COPYING GARBAGE COLLECTOR

BACKGROUND OF THE INVENTION

1. Field of the Invention

The methods, processes and/or systems described herein are directed to memory management. They particularly concern what has come to be known as "garbage collection."

2. Background Information

In the field of computer systems, considerable effort has been expended on the task of allocating memory to data objects. For the purposes of this discussion, the term object refers to a data structure represented in a computer system's memory. Other terms sometimes used for the same concept are record and structure. An object may be identified by a reference, a relatively small amount of information that can be used to access the object. A reference can be represented as a "pointer" or a "machine address," which may require, for instance, only sixteen, thirty-two, or sixty-four bits of information, although there are other ways to represent a reference.

In some systems, which are usually known as "object oriented," objects may have associated methods, which are routines that can be invoked by reference to the object. They also may belong to a class, which is an organizational entity that may contain method code or other information shared by all objects belonging to that class. In the discussion that follows, though, the term object will not be limited to such structures; it will additionally include structures with which methods and classes are not associated.

The methods, processes and/or systems described below are applicable to methods, processes and/or systems that allocate memory to objects dynamically. Not all systems employ dynamic allocation. In some computer languages, source programs must be so written that all objects to which the program's variables refer are bound to storage locations at compile time. This storage-allocation approach, sometimes referred to as "static allocation," is the policy traditionally used by the Fortran programming language, for example.

Even for compilers that are thought of as allocating objects only statically, of course, there is often a certain level of abstraction to this binding of objects to storage locations. Consider the typical computer system 10 depicted in FIG. 1, for example. Data, and instructions for operating on them, that a microprocessor 11 uses may reside in on-board cache memory or be received from further cache memory 12, possibly through the mediation of a cache controller 13. That controller 13 can in turn receive such data from system read/write memory ("RAM") 14 through a RAM controller 15 or from various peripheral devices through a system bus 16. The memory space made available to an application program may be "virtual" in the sense that it may actually be considerably larger than RAM 14 provides. So the RAM contents will be swapped to and from a system disk 17.

Additionally, the actual physical operations performed to access some of the most-recently visited parts of the process's address space often will actually be performed in the cache 12 or in a cache on board microprocessor 11 rather than on the RAM 14, with which those caches swap data and instructions just as RAM 14 and system disk 17 do with each other.

A further level of abstraction results from the fact that an application will often be run as one of many processes operating concurrently with the support of an underlying operating system. As part of that system's memory management, the application's memory space may be moved among different actual physical locations many times in order to allow different processes to employ shared physical memory devices. That is, the location specified in the application's machine code may actually result in different physical locations at different times because the operating system adds different offsets to the machine-language-specified location.

Despite these expedients, the use of static memory allocation in writing certain long-lived applications makes it difficult to restrict storage requirements to the available memory space. Abiding by space limitations is easier when the platform provides for dynamic memory allocation, i.e., when memory space to be allocated to a given object is determined only at run time.

Dynamic allocation has a number of advantages, among which is that the run-time system is able to adapt allocation to run-time conditions. For example, the programmer can specify that space should be allocated for a given object only in response to a particular run-time condition. The C-language library function malloc( ) is often used for this purpose. Conversely, the programmer can specify conditions under which memory previously allocated to a given object can be reclaimed for reuse. The C-language library function free( ) results in such memory reclamation.

Because dynamic allocation provides for memory reuse, it facilitates generation of large or long-lived applications, which over the course of their lifetimes may employ objects whose total memory requirements would greatly exceed the available memory resources if they were bound to memory locations statically.

Particularly for long-lived applications, though, allocation and reclamation of dynamic memory must be performed carefully. If the application fails to reclaim unused memory-or, worse, loses track of the address of a dynamically allocated segment of memory-its memory requirements will grow over time to exceed the system's available memory. This kind of error is known as a "memory leak."

Another kind of error occurs when an application reclaims memory for reuse even though it still maintains a reference to that memory. If the reclaimed memory is reallocated for a different purpose, the application may inadvertently manipulate the same memory in multiple inconsistent ways. This kind of error is known as a "dangling reference," because an application should not retain a reference to a memory location once that location is reclaimed. Explicit dynamic-memory management by using interfaces like malloc( )/free( ) often leads to these problems.

A way of reducing the likelihood of such leaks and related errors is to provide memory-space reclamation in a more-automatic manner. Techniques used by systems that reclaim memory space automatically are commonly referred to as "garbage collection." Garbage collectors operate by reclaiming space that they no longer consider "reachable." Statically allocated objects represented by a program's global variables are normally considered reachable throughout a program's life. Such objects are not ordinarily stored in the garbage collector's managed memory space, but they may contain references to dynamically allocated objects that are, and such objects are considered reachable. Clearly, an object referred to in the processor's call stack is reachable, as is an object referred to by register contents. And an object referred to by any reachable object is also reachable.

The use of garbage collectors is advantageous because, whereas a programmer working on a particular sequence of code can perform his task creditably in most respects with only local knowledge of the application at any given time, memory allocation and reclamation require a global knowledge of the program. Specifically, a programmer dealing with a given sequence of code does tend to know whether some portion of memory is still in use for that sequence of code, but it is considerably more difficult for him to know what the rest of the application is doing with that memory. By tracing references from some conservative notion of a "root set," e.g., global variables, registers, and the call stack, automatic garbage collectors obtain global knowledge in a methodical way. By using a garbage collector, the programmer is relieved of the need to worry about the application's global state and can concentrate on local-state issues, which are more manageable. The result is applications that are more robust, having no dangling references and fewer memory leaks.

Garbage-collection mechanisms can be implemented by various parts and levels of a computing system. One approach is simply to provide them as part of a batch compiler's output. Consider FIG. 2's simple batch-compiler operation, for example. A computer system executes in accordance with compiler object code and therefore acts as a compiler 20. The compiler object code is typically stored on a medium such as FIG. 1's system disk 17 or some other machine-readable medium, and it is loaded into RAM 14 to configure the computer system to act as a compiler. In some cases, though, the compiler object code's persistent storage may instead be provided in a server system remote from the machine that performs the compiling. The electrical signals that carry the digital data by which the computer systems exchange that code are examples of the kinds of electro magnetic signals by which the computer instructions can be communicated. Others are radio waves, microwaves, and both visible and invisible light.

The input to the compiler is the application source code, and the end product of the compiler process is application object code. This object code defines an application 21, which typically operates on input such as mouse clicks, etc., to generate a display or some other type of output. This object code implements the relationship that the programmer intends to specify by his application source code. In one approach to garbage collection, the compiler 20, without the programmer's explicit direction, additionally generates code that automatically reclaims unreachable memory space.

Even in this simple case, though, there is a sense in which the application does not itself provide the entire garbage collector. Specifically, the application will typically call upon the underlying operating system's memory-allocation functions. And the operating system may in turn take advantage of various hardware that lends itself particularly to use in garbage collection. So even a very simple system may disperse the garbage-collection mechanism over a number of computer-system layers.

To get some sense of the variety of system components that can be used to implement garbage collection, consider FIG. 3's example of a more complex way in which various levels of source code can result in the machine instructions that a processor executes. In the FIG. 3 arrangement, the human applications programmer produces source code 22 written in a high-level language. A compiler 23 typically converts that code into "class files." These files include routines written in instructions, called "byte codes" 24, for a "virtual machine" that various processors can be software-configured to emulate. This conversion into byte codes is almost always separated in time from those codes' execution, so FIG. 3 divides the sequence into a "compile-time environment" separate from a "run-time environment" 26, in which execution occurs. One example of a high-level language for which compilers are available to produce such virtual-machine instructions is the Java programming language. (Java® is a trademark or registered trademark of Sun Microsystems, Inc., in the United States and other countries.)

Most typically, the class files' byte-code routines are executed by a processor under control of a virtual-machine process 27. That process emulates a virtual machine from whose instruction set the byte codes are drawn. As is true of the compiler 23, the virtual-machine process 27 may be specified by code stored on a local disk or some other machine-readable medium from which it is read into FIG. 1's RAM 14 to configure the computer system to implement the garbage collector and otherwise act as a virtual machine. Again, though, that code's persistent storage may instead be provided by a server system remote from the processor that implements the virtual machine, in which case the code would be transmitted electrically or optically to the virtual-machine-implementing processor.

In some implementations, much of the virtual machine's action in executing these byte codes is most like what those skilled in the art refer to as "interpreting," so FIG. 3 depicts the virtual machine as including an "interpreter" 28 for that purpose. In addition to or instead of running an interpreter, many virtual-machine implementations actually compile the byte codes concurrently with the resultant object code's execution, so FIG. 3 depicts the virtual machine as additionally including a "just-in-time" compiler 29. The arrangement of FIG. 3 differs from FIG. 2 in that the compiler 23 for converting the human programmer's code does not contribute to providing the garbage-collection function; that results largely from the virtual machine 27's operation.

Those skilled in that art will recognize that both of these organizations are merely exemplary, and many modern systems employ hybrid mechanisms, which partake of the characteristics of traditional compilers and traditional interpreters both. The methods, processes and/or systems described herein are applicable independently of whether a batch compiler, a just-in-time compiler, an interpreter, or some hybrid is employed to process source code. In the remainder of this application, therefore, we will use the term compiler to refer to any such mechanism, even if it is what would more typically be called an interpreter.

The arrangement of FIG. 3 differs from FIG. 2 in that the compiler 23 for converting the human programmer's code does not contribute to providing the garbage-collection function; that results largely from the virtual machine 27's operation. Although the FIG. 3 arrangement is a popular one, it is by no means universal, and many further implementation types can be expected. Proposals have even been made to implement the virtual machine 27's behavior in a hardware processor, in which case the hardware itself would provide some or all of the garbage-collection function.

In short, garbage collectors can be implemented in a wide range of combinations of hardware and/or software. As is true of most of the garbage-collection techniques described in the literature, the methods, processes and/or systems described herein are applicable to most such methods, processes and/or systems.

By implementing garbage collection, a computer system can greatly reduce the occurrence of memory leaks and other software deficiencies in which human programming frequently results. But it can also have significant adverse performance effects if it is not implemented carefully. To distinguish the part of the program that does "useful" work from that which does the garbage collection, the term mutator is sometimes used in discussions of these effects; from the collector's point of view, what the mutator does is mutate active data structures' connectivity.

Some garbage-collection approaches rely heavily on interleaving garbage is collection steps among mutator steps. In one type of garbage-collection approach, for instance, the mutator operation of writing a reference is followed immediately by garbage-collector steps used to maintain a reference count in that object's header, and code for subsequent new-object storage includes steps for finding space occupied by objects whose reference count has fallen to zero. Obviously, such an approach can slow mutator operation significantly.

Other approaches therefore interleave very few garbage-collector-related instructions into the main mutator process but instead interrupt it from time to time to perform garbage-collection cycles, in which the garbage collector finds unreachable objects and reclaims their memory space for reuse. Such an approach will be assumed in discussing FIG. 4's depiction of a simple garbage-collection operation. Within the memory space allocated to a given application is a part 40 managed by automatic garbage collection. In the following discussion, this will be referred to as the "heap," although in other contexts that term refers to all dynamically allocated memory. During the course of the application's execution, space is allocated for various objects 42, 44, 46, 48, and 50. Typically, the mutator allocates space within the heap by invoking the garbage collector, which at some level manages access to the heap. Basically, the imitator asks the garbage collector for a pointer to a heap region where it can safely place the object's data. The garbage collector keeps track of the fact that the thus-allocated region is occupied. It will refrain from allocating that region in response to any other request until it determines that the mutator no longer needs the region allocated to that object.

Garbage collectors vary as to which objects they consider reachable and unreachable. For the present discussion, though, an object will be considered "reachable" if it is referred to, as object 42 is, by a reference in the root set 52. The root set consists of reference values stored in the mutator's threads' call stacks, the CPU registers, and global variables outside the garbage-collected heap. An object is also reachable if it is referred to, as object 46 is, by another reachable object (in this case, object 42). Objects that are not reachable can no longer affect the program, so it is safe to re-allocate the memory spaces that they occupy.

A typical approach to garbage collection is therefore to identify all reachable objects and reclaim any previously allocated memory that the reachable objects do not occupy. A typical garbage collector may identify reachable objects by tracing references from the root set 52. For the sake of simplicity, FIG. 4 depicts only one reference from the root set 52 into the heap 40. (Those skilled in the art will recognize that there are many ways to identify references, or at least data contents that may be references.) The collector notes that the root set points to object 42, which is therefore reachable, and that reachable object 42 points to object 46, which therefore is also reachable. But those reachable objects point to no other objects, so objects 44, 48, and 50 are all unreachable, and their memory space may be reclaimed. This may involve, say, placing that memory space in a list of free memory blocks.

To avoid excessive heap fragmentation, some garbage collectors additionally relocate reachable objects. FIG. 5 shows a typical approach. The heap is partitioned into two halves, hereafter called "semi-spaces." For one garbage-collection cycle, all objects are allocated in one semi-space 54, leaving the other semi-space 56 free. When the garbage-collection cycle occurs, objects identified as reachable are "evacuated" to the other semi-space 56, so all of semi-space 54 is then considered free. Once the garbage collection cycle has occurred, all new objects are allocated in the lower semi-space 56 until yet another garbage-collection cycle occurs, at which time the reachable objects are evacuated back to the upper semi-space 54. In the following discussion, the term from-space can be used to describe that part of the heap whose reachable objects are being evacuated and the term to-space can be used to describe that part of the heap to which objects are evacuated.

Although this relocation requires the extra steps of copying the reachable objects and updating references to them, it tends to be quite efficient, since most new objects quickly become unreachable, so most of the current semi-space is actually garbage. That is, only a relatively few, reachable objects need to be relocated, after which the entire semi-space contains only garbage and can be pronounced free for reallocation.

Now, a collection cycle can involve following all reference chains from the basic root set—i.e., from inherently reachable locations such as the call stacks, class statistics and other global variables, and registers—and reclaiming all space occupied by objects not encountered in the process. And the simplest way of performing such a cycle is to interrupt the mutator to provide a collector interval in which the entire cycle is performed before the mutator resumes. For certain types of applications, this approach to collection cycle scheduling is acceptable and, in fact, highly efficient.

For many interactive and real-time applications, though, this approach is not acceptable. The delay in mutator operation that the collection cycle's execution causes can be annoying to a user and can prevent a real-time application from responding to its environment with the required speed. In some applications, choosing collection times opportunistically can reduce this effect. Collection intervals can be inserted when an interactive mutator reaches a point at which it awaits user input, for instance.

So it may often be true that the garbage-collection operation's effect on performance can depend less on the total collection time than on when collections actually occur. But another factor that often is even more determinative is the duration of any single collection interval, i.e., how long the mutator must remain quiescent at any one time. In an interactive system, for instance, a user may never notice hundred-millisecond interruptions for garbage collection, whereas most users would find interruptions lasting for two seconds to be annoying.

So the cycle may be divided up among a plurality of collector intervals. When a collection cycle is divided up among a plurality of collection intervals, it is only after a number of intervals that the collector will have followed all reference chains and be able to identify as garbage any objects not thereby reached. This approach is more complex than completing the cycle in a single collection interval; the mutator will usually modify references between collection intervals, so the collector must repeatedly update its view of the reference graph in the midst of the collection cycle. To make such updates practical, the mutator must communicate with the collector to let it know what reference changes are made between intervals.

An even more complex approach, which some systems use to eliminate discrete pauses or maximize resource-use efficiency, is to execute the mutator and collector in concurrent execution threads. Most systems that use this approach use it for most but not all of the collection cycle; the mutator is usually interrupted for a short collector interval, in which a part of the collector cycle takes place without mutation.

Independent of whether the collection cycle is performed concurrently with mutator operation, is completed in a single interval, or extends over multiple intervals is the question of whether the cycle is complete, as has tacitly been assumed so far, or is instead "incremental." In incremental collection, a collection cycle constitutes only an increment of collection: the collector does not follow all reference chains from the basic root set completely. Instead, it concentrates on only a portion, or collection set, of the heap. Specifically, it identifies every collection set object referred to by a reference chain that extends into the collection set from outside of it, and it reclaims the collection set space not occupied by such objects, possibly after evacuating them from the collection set. The collection can form the from-space, and the cars to which reachable objects in the collection set are evacuated can form the to-space.

By thus culling objects referenced by reference chains that do not necessarily originate in the basic root set, the collector can be thought of as expanding the root set to include as roots some locations that may not be reachable. Although incremental collection thereby leaves "floating garbage," it can result in relatively low pause times even if entire collection increments are completed during respective single collection intervals.

Most collectors that employ incremental collection operate in "generations," although this is not necessary in principle. Different portions, or generations, of the heap are subject to different collection policies. New objects are allocated in a "young" generation, and older objects are promoted from younger generations to older or more "mature" generations. Collecting the younger generations more frequently than the others yields greater efficiency because the younger generations tend to accumulate garbage faster; newly allocated objects tend to "die," while older objects tend to "survive."

But generational collection greatly increases what is effectively the root set for a given generation. Consider FIG. 6, which depicts a heap as organized into three generations 58, 60, and 62. Assume that generation 60 is to be collected. The process for this individual generation may be more or less the same as that described in connection with FIGS. 4 and 5 for the entire heap, with one major exception. In the case of a single generation, the root set must be considered to include not only the call stack, registers, and global variables represented by set 52 but also objects in the other generations 58 and 62, which themselves may contain references to objects in generation 60. So pointers must be traced not only from the basic root set 52 but also from objects within the other generations.

One could perform this tracing by simply inspecting all references in all other generations at the beginning of every collection interval, and it turns out that this approach is actually feasible in some situations. But it takes too long in other situations, so workers in this field have employed a number of approaches to expediting reference tracing. One approach is to include so-called write barriers in the mutator process. A write barrier is code added to a write operation to record information from which the collector can determine where references were written or may have been since the last collection interval. A reference list can then be maintained by taking such a list as it existed at the end of the previous collection interval and updating it by inspecting only locations identified by the write barrier as possibly modified since the last collection interval.

One of the many write-barrier implementations commonly used by workers in this art employs what has been referred to as the "card table.". FIG. 6 depicts the various generations as being divided into smaller sections, known for this purpose as "cards." Card tables 64, 66, and 68 associated with respective generations contain an entry for each of their cards. When the mutator writes a reference in a card, it makes an appropriate entry in the card-table entry associated with that card (or, say, with the card in which the object containing the reference begins). Most write-barrier implementations simply make a Boolean entry indicating that the write operation has been performed, although some may be more elaborate. The mutator having thus left a record of where new or modified references may be, the collector can thereafter prepare appropriate summaries of that information, as will be explained in due course. For the sake of concreteness, we will assume that the summaries are maintained by steps that occur principally at the beginning of each collection cycle.

Of course, there are other write-barrier approaches, such as simply having the write barrier add to a list of addresses where references where written. Also, although there is no reason in principle to favor any particular number of generations, and although FIG. 6 shows three, most generational garbage collectors have only two generations, of which one is the young generation and the other is the mature generation. Moreover, although FIG. 6 shows the generations as being of the same size, a more-typical configuration is for the young generation to be considerably smaller. Finally, although we assumed for the sake of simplicity that collection during a given cycle was limited to only one generation, a more-typical approach is actually to collect the whole young generation at every cycle but to collect the mature one less frequently.

Some collectors collect the entire young generation in every collection step and may thereafter perform mature-generation in the same collection step. It may therefore take relatively little time to scan all young-generation objects remaining after young generation collection to find references into the mature generation. Even when such collectors do use card tables, therefore, they often do not use them for finding young generation references that refer to mature-generation objects. On the other hand, laboriously scanning the entire mature generation for references to young-generation (or mature-generation) objects would ordinarily take too long, so the collector uses the card table to limit the amount of memory it searches for mature-generation references.

Now, although it typically takes very little time to collect the young generation, it may take more time than is acceptable within a single garbage-collection cycle to collect the entire mature generation. So some garbage collectors may collect the mature generation incrementally; that is, they may perform only a part of the mature generation's collection during any particular collection cycle. Incremental collection presents the problem that since the generation's unreachable objects outside the "collection set" of objects processed during that cycle cannot be recognized as unreachable, collection set objects to which they refer tend not to be, either.

To reduce the adverse effect this would otherwise have on collection efficiency, workers in this field have employed the "Train algorithm," which FIG. 7 depicts. A generation to be collected incrementally is divided into sections, which for reasons about to be described are referred to as "car sections." Conventionally, a generation's incremental collection occurs in fixed-size sections, and a car section's size is that of the generation portion to be collected during one cycle.

The discussion that follows will occasionally employ the nomenclature in the literature by using the term car instead of car section. But the literature seems to use that term to refer variously not only to memory sections themselves but also to data structures that the Train algorithm employs to manage them when they contain objects, as well as to the more-abstract concept that the car section and managing data structure represent in discussions of the algorithm. So the following discussion will more frequently use the expression car section to emphasize the actual sections of memory space for whose management the car concept is employed.

According to the Train algorithm, the car sections are grouped into "trains," which are ordered, conventionally according to age. For example, FIG. 7 shows an oldest train 73 consisting of a generation 74's three car sections described by associated data structures 75, 76, and 78, while a second train 80 consists only of a single car section, represented by structure 82, and the youngest train 84 (referred to as the "allocation train") consists of car sections that data structures 86 and 88 represent. As will be seen below, car sections' train memberships can change, and any car section added to a train is typically added to the end of a train.

Conventionally, the car collected in a cycle is the one earliest added to the oldest train, which in this case is car 75. All of the generation's cars can thus be thought of as 13 waiting for collection in a single long line, in which cars are ordered in accordance with the order of the trains to which they belong and, within trains, in accordance with the order in which they were added to those trains.

As is usual, the way in which reachable objects are identified is to determine whether there are references to them in the root set or in any other object already determined to be reachable. In accordance with the Train algorithm, the collector additionally performs a test to determine whether there are any references at all from outside the oldest train to objects within it. If there are not, then all cars within the train can be reclaimed, even though not all of those cars are in the collection set. And the Train algorithm so operates that inter-car references tend to be grouped into trains, as will now be explained.

To identify references into the car from outside of it, train-algorithm implementations typically employ "remembered sets." As card tables are, remembered sets are used to keep track of references. Whereas a card-table entry contains information about references that the associated card contains, though, a remembered set associated with a given region contains information about references into that region from locations outside of it. In the case of the Train algorithm, remembered sets are associated with car sections. Each remembered set, such as car 75's remembered set 90, lists locations in the generation that contain references into the associated car section.

The remembered sets for all of a generation's cars are typically updated at the start of each collection cycle. To illustrate how such updating and other collection operations may be carried out, FIGS. 8A and 8B (together, "FIG. 8") depict an operational sequence in a system of the typical type mention above. That is, it shows a sequence of operations that may occur in a system in which the entire garbage-collected heap is divided into two generations, namely, a young generation and an old generation, and in which the young generation is much smaller than the old generation. FIG. 8 is also based on the assumption and that the Train algorithm is used only for collecting the old generation.

Block 102 represents a period of the mutator's operation. As was explained above, the mutator makes a card-table entry to identify any card that it has "dirtied" by 14 adding or modifying a reference that the card contains. At some point, the mutator will be interrupted for collector operation. Different implementations employ different events to trigger such an interruption, but we will assume for the sake of concreteness that the system's dynamic-allocation routine causes such interruptions when no room is left in the young generation for any further allocation. A dashed line 103 represents the transition from mutator operation and collector operation.

In the system assumed for the FIG. 8 example, the collector collects the (entire) young generation each time such an interruption occurs. When the young generation's collection ends, the mutator operation usually resumes, without the collector's having collected any part of the old generation. Once in a while, though, the collector also collects part of the old generation, and FIG. 8 is intended to illustrate such an occasion.

When the collector's interval first starts, it first processes the card table, in an operation that block 104 represents. As was mentioned above, the collector scans the "dirtied" cards for references into the young generation. If a reference is found, that fact is memorialized appropriately. If the reference refers to a young-generation object, for example, an expanded card table may be used for this purpose. For each card, such an expanded card table might include a multi-byte array used to summarize the card's reference contents. The summary may, for instance, be a list of offsets that indicate the exact locations within the card of references to young-generation objects, or it may be a list of fine-granularity "sub-cards" within which references to young-generation objects may be found. If the reference refers to an old-generation object, the collector often adds an entry to the remembered set associated with the car containing that old-generation object. The entry identifies the reference's location, or at least a small region in which the reference can be found. For reasons that will become apparent, though, the collector will typically not bother to place in the remembered set the locations of references from objects in car sections farther forward in the collection queue than the referred-to object, i.e., from objects in older trains or in cars added earlier to the same train.

The collector then collects the young generation, as block 105 indicates. (Actually, young-generation collection may be interleaved with the dirty-region scanning, but the drawing illustrates it for purpose of explanation as being separate.) If a young-generation object is referred to by a reference that card-table scanning has revealed, that object is considered to be potentially reachable, as is any young-generation object referred to by a reference in the root set or in another reachable young-generation object. The space occupied by any young-generation object thus considered reachable is withheld from reclamation. For example, it may be evacuated to a young-generation semi-space that will be used for allocation during the next mutator interval. It may instead be promoted into the older generation, where it is placed into a car containing a reference to it or into a car in the last train. Or some other technique may be used to keep the memory space it occupies off the system's free list. The collector then reclaims any young generation space occupied by any other objects, i.e., by any young-generation objects not identified as transitively reachable through references located outside the young generation.

The collector then performs the Train algorithm's central test, referred to above, of determining whether there are any references into the oldest train from outside of it. As was mentioned above, the actual process of determining, for each object, whether it can be identified as unreachable is performed for only a single car section in any cycle. In the absence of features such as those provided by the Train algorithm, this would present a problem, because garbage structures may be larger than a car section. Objects in such structures would therefore (erroneously) appear reachable, since they are referred to from outside the car section under consideration. But the Train algorithm additionally keeps track of whether there are any references into a given car from outside the train to which it belongs, and trains' sizes are not limited. As will be apparent presently, objects not found to be unreachable are relocated in such a way that garbage structures tend to be gathered into respective trains into which, eventually, no references from outside the train point. If no references from outside the train point to any objects inside the train, the train can be recognized as containing only garbage. This is the test that block 106 represents. All cars in a train thus identified as containing only garbage can be reclaimed.

The question of whether old-generation references point into the train from outside of it is (conservatively) answered in the course of updating remembered sets; in the course of updating a car's remembered set, it is a simple matter to flag the car as being referred to from outside the train. The step-106 test additionally involves determining whether any references from outside the old generation point into the oldest train. Various approaches to making this determination have been suggested, including the conceptually simple approach of merely following all reference chains from the root set until those chains (1) terminate, (2) reach an old-generation object outside the oldest train, or (3) reach an object in the oldest train. In the two-generation example, most of this work can be done readily by identifying references into the collection set from live young-generation objects during the young-generation collection. If one or more such chains reach the oldest train, that train includes reachable objects. It may also include reachable objects if the remembered-set-update operation has found one or more references into the oldest train from outside of it. Otherwise, that train contains only garbage, and the collector reclaims all of its car sections for reuse, as block 107 indicates. The collector may then return control to the mutator, which resumes execution, as FIG. 8's block 108 indicates.

If the train contains reachable objects, on the other hand, the collector turns to evacuating potentially reachable objects from the collection set. The first operation, which block 110 represents, is to remove from the collection set any object that is reachable from the root set by way of a reference chain that does not pass through the part of the old generation that is outside of the collection set. In the illustrated arrangement, in which there are only two generations, and the young generation has previously been completely collected during the same interval, this means evacuating from a collection set any object that (1) is directly to referred to by a reference in the root set, (2) is directly referred to by a reference in the young generation (in which no remaining objects have been found unreachable), and (3) is referred to by any reference in an object thereby evacuated. All of the objects thus evacuated are placed in cars in the youngest train, which was newly created during the collection cycle. Certain of the mechanics involved in the evacuation process are described in more detail in connection with similar evacuation performed, as blocks 112 and 114 indicate, in response to remembered-set entries.

FIG. 9 illustrates how the processing represented by block 114 proceeds. The entries identify heap regions, and, as block 116 indicates, the collector scans the thus identified heap regions to find references to locations in the collection set. As blocks 118 and 120 indicate, that entry's processing continues until the collector finds no more such references. Every time the collector does find such a reference, it checks to determine whether, as a result of a previous entry's processing, the referred-to object has already been evacuated. If it has not, the collector evacuates the referred-to object to a (possibly new) car in the train containing the reference, as blocks 122 and 124 indicate.

As FIG. 10 indicates, the evacuation operation includes more than just object relocation, which block 126 represents. Once the object has been moved, the collector places a forwarding pointer in the collection set location from which it was evacuated, for a purpose that will become apparent presently. Block 128 represents that step. (Actually, there are some cases in which the evacuation is only a "logical" evacuation: the car containing the object is simply re-linked to a different logical place in the collection sequence, but its address does not change. In such cases, forwarding pointers are unnecessary.) Additionally, the reference in response to which the object was evacuated is updated to point to the evacuated object's new location, as block 130 indicates. And, as block 132 indicates, any reference contained in the evacuated object is processed, in an operation that FIGS. 11 A and 11 B (together, "FIG. 11") depict.

For each one of the evacuated object's references, the collector checks to see whether the location that it refers to is in the collection set. As blocks 134 and 136 indicate, the reference processing continues until all references in the evacuated object have been processed. In the meantime, if a reference refers to a collection set location that contains an object not yet evacuated, the collector evacuates the referred-to object to the train to which the evacuated object containing the reference was evacuated, as blocks 138 and 140 indicate.

If the reference refers to a location in the collection set from which the object has already been evacuated, then the collector uses the forwarding pointer left in that location to update the reference, as block 142 indicates. Before the processing of FIG. 11, the remembered set of the referred-to object's car will have an entry that identifies the evacuated object's old location as one containing a reference to the referred-to object. But the evacuation has placed the reference in a new location, for which the remembered set of the referred-to object's car may not have an entry. So, if that new location is not as far forward as the referred-to object, the collector adds to that remembered set an entry identifying the reference's new region, as blocks 144 and 146 indicate. As the drawings show, the same type of remembered-set update is performed if the object referred to by the evacuated reference is not in the collection set.

Now, some train-algorithm implementations postpone processing of the references contained in evacuated collection set objects until after all collection set objects have been collected. In the implementation that FIG. 10 illustrates, though, the processing of a given evacuated object's references occurs before the next object is evacuated. So FIG. 11's blocks 134 and 148 indicate that the FIG. 11 operation is completed when all of the references contained in the evacuated object have been processed. This completes FIG. 10's object-evacuation operation, which FIG. 9's block 124 represents.

As FIG. 9 indicates, each collection set object referred to by a reference in a remembered-set-entry-identified location is thus evacuated if it has not been already. If the object has already been evacuated from the referred-to location, the reference to that location is updated to point to the location to which the object has been evacuated. If the remembered set associated with the car containing the evacuated object's new location does not include an entry for the reference's location, it is updated to do so if the car containing the reference is younger than the car containing the evacuated object. Block 150 represents updating the reference and, if necessary, the remembered set.

As FIG. 8's blocks 112 and 114 indicate, this processing of collection set remembered sets is performed initially only for entries that do not refer to locations in the oldest train. Those that do are processed only after all others have been, as blocks 152 and 154 indicate.

When this process has been completed, the collection set's memory space can be reclaimed, as block 164 indicates, since no remaining object is referred to from outside the collection set: any remaining collection set object is unreachable. The collector then relinquishes control to the mutator.

FIGS. 12A-12J illustrate results of using the Train algorithm. FIG. 12A represents a generation in which objects have been allocated in nine car sections. The oldest train has four cars, numbered 1.1 through 1.4. Car 1.1 has two objects, A and B. There is a reference to object B in the root set (which, as was explained above, includes live objects in the other generations). Object A is referred to by object L, which is in the third train's sole car section. In the generation's remembered sets 170, a reference in object L has therefore been recorded against car 1.1.

Processing always starts with the oldest train's earliest-added car, so the garbage collector refers to car 1.1's remembered set and finds that there is a reference from object L into the car being processed. It accordingly evacuates object A to the train that object L occupies. The object being evacuated is often placed in one of the selected train's existing cars, but we will assume for present purposes that there is not enough room. So the garbage collector evacuates object A into a new car section and updates appropriate data structures to identify it as the next car in the third train. FIG. 12B depicts is the result: a new car has been added to the third train, and object A is placed in it.

FIG. 12B also shows that object B has been evacuated to a new car outside the first train. This is because object B has an external reference, which, like the reference to object A, is a reference from outside the first train, and one goal of the processing is to form trains into which there are no further references. Note that, to maintain a reference to the same object, object L's reference to object A has had to be rewritten, and so have object B's reference to object A and the inter-generational pointer to object B. In the illustrated example, the garbage collector begins a new train for the car into which object B is evacuated, but this is not a necessary requirement of the Train algorithm. That algorithm requires only that externally referenced objects be evacuated to a newer train.

Since car 1.1 no longer contains live objects, it can be reclaimed, as FIG. 12B also indicates. Also note that the remembered set for car 2.1 now includes the address of a reference in object A, whereas it did not before. As was stated before, remembered sets in the illustrated embodiment include only references from cars further back in the order than the one with which the remembered set is associated. The reason for this is that any other cars will already be reclaimed by the time the car associated with that remembered set is processed, so there is no reason to keep track of references from them.

The next step is to process the next car, the one whose index is 1.2. Conventionally, this would not occur until some collection cycle after the one during which car 1.1 is collected. For the sake of simplicity we will assume that the mutator has not changed any references into the generation in the interim.

FIG. 12B depicts car 1.2 as containing only a single object, object C, and that car's remembered set contains the address of an inter-car reference from object F. The garbage collector follows that reference to object C. Since this identifies object C as possibly reachable, the garbage collector evacuates it from car set 1.2, which is to be reclaimed. Specifically, the garbage collector removes object C to a new car section, section 1.5, which is linked to the train to which the referring object F's car belongs. Of course, object F's reference needs to be updated to object C's new location. FIG. 12C depicts the evacuation's result.

FIG. 12C also indicates that car set 1.2 has been reclaimed, and car 1.3 is next to be processed. The only address in car 1.3's remembered set is that of a reference in object G. Inspection of that reference reveals that it refers to object F. Object F may therefore be reachable, so it must be evacuated before car section 1.3 is reclaimed. On the other hand, there are no references to objects D and E, so they are clearly garbage. FIG. 12D depicts the result of reclaiming car 1.3's space after evacuating possibly reachable object F.

In the state that FIG. 12D depicts, car 1.4 is next to be processed, and its remembered set contains the addresses of references in objects K and C. Inspection of object K's reference reveals that it refers to object H, so object H must be evacuated. Inspection of the other remembered-set entry, the reference in object C, reveals that it refers to object G, so that object is evacuated, too. As FIG. 12E illustrates, object H must be added to the second train, to which its referring object K belongs. In this case there is room enough in car 2.2, which its referring object K occupies, so evacuation of object H does not require that object K's reference to object H be added to car 2.2's remembered set. Object G is evacuated to a new car in the same train, since that train is where referring object C resides. And the address of the reference in object G to object C is added to car 1.5's remembered set.

FIG. 12E shows that this processing has eliminated all references into the first train, and it is an important part of the Train algorithm to test for this condition. That is, even though there are references into both of the train's cars, those cars' contents can be recognized as all garbage because there are no references into the train from outside of it. So all of the first train's cars are reclaimed.

The collector accordingly processes car 2.1 during the next collection cycle, and that car's remembered set indicates that there are two references outside the car that refer to objects within it. Those references are in object K, which is in the same train, and object A, which is not. Inspection of those references reveals that they refer to objects I and J, which are evacuated.

The result, depicted in FIG. 12F, is that the remembered sets for the cars in the second train reveal no inter-car references, and there are no inter-generational references into it, either. That train's car sections therefore contain only garbage, and their memory space can be reclaimed.

So car 3.1 is processed next. Its sole object, object L, is referred to inter-generationally as well as by a reference in the fourth train's object M. As FIG. 12G shows, object L is therefore evacuated to the fourth train. And the address of the reference in object L to object A is placed in the remembered set associated with car 3.2, in which object A resides.

The next car to be processed is car 3.2, whose remembered set includes the addresses of references into it from objects B and L. Inspection of the reference from object B reveals that it refers to object A, which must therefore be evacuated to the fifth train before car 3.2 can be reclaimed. Also, we assume that object A cannot fit in car section 5.1, so a new car 5.2 is added to that train, as FIG. 12H shows, and object A is placed in its car section. All referred-to objects in the third train having been evacuated, that (single-car) train can be reclaimed in its entirety.

A further observation needs to be made before we leave FIG. 12G. Car 3.2's remembered set additionally lists a reference in object L, so the garbage collector inspects that reference and finds that it points to the location previously occupied by object A. This brings up a feature of copying-collection techniques such as the typical train-algorithm implementation. When the garbage collector evacuates an object from a car section, it marks the location as having been evacuated and leaves the address of the object's new location. So, when the garbage collector traces the reference from object L, it finds that object A has been removed, and it accordingly copies the new location into object L as the new value of its reference to object A.

In the state that FIG. 12H illustrates, car 4.1 is the next to be processed. Inspection of the fourth train's remembered sets reveals no inter-train references into it, but the inter-generational scan (possibly performed with the aid of FIG. 6's card tables) reveals inter-generational references into car 4.2. So the fourth train cannot be reclaimed yet. The garbage collector accordingly evacuates car 4.1's referred-to objects in the normal manner, with the result that FIG. 12I depicts.

In that state, the next car to be processed has only inter-generational references into it. So, although its referred-to objects must therefore be evacuated from the train, they cannot be placed into trains that contain references to them. Conventionally, such objects are evacuated to a train at the end of the train sequence. In the illustrated implementation, a new train is formed for this purpose, so the result of car 4.2's processing is the state that FIG. 12J depicts.

Processing continues in this same fashion. Of course, subsequent collection cycles will not in general proceed, as in the illustrated cycles, without any reference changes by the mutator and without any addition of further objects. But reflection reveals that the general approach just described still applies when such mutations occur.

In the Train algorithm, as discussed herein, a continuing problem for incremental, concurrent copying garbage collectors, (collectors that interleave operation with an application) is that, if an object has been relocated into to-space and later the application modifies the original object in from-space, that modification must be recognized and the changes remembered or logged so that the collector may later scan the remembered changes and propagate those changes to the re-located objects. The application changes may include new roots and changes to references, and one issue is how to relocate objects when these changes are happening concurrently.

Some prior solutions have employed a to-space invariant that forces the application to modify objects only in to-space by write protecting from-space. This guarantees that the application is modifying an up-to-date object, but burdens the application. When the application writes to an object in from-space, the write protection traps to a handler that causes the application to re-locate the object whereupon the application then modifies the re-located object. This operation is comparatively costly asking the application to perform the re-location.

Other prior solutions have used a from-space invariant that allows the application to operate on from-space, therefore with little or no impact on the application, since the from-space addresses are those available to the application. However, a write barrier must be used to explicitly log all updates in the heap to a per-thread log. The collector later scans the log and makes the proper modifications in the relocated object. Typically the collector scans the log near the end of the collection cycle, so that the modifications are made in the relocated objects and the references to these objects are updated near the switching of the to-space to from-space. This has proven to be somewhat more efficient.

Other collectors have been suggested that work on both from-space and to-space copies of objects during collection. However, prior solutions have not been applied to an incremental collector that is able to bound the size of the collection set, leading to impacts on their efficiency when applied to a technique like the Train algorithm. First, by bounding the size of the collection set, only the changes to that (logical) subset of the heap need to be tracked and not changes to the entirety of the subset. Second, only changes for part of the collection process need to be tracked. Normally, memory-protecting the entire heap would not be effective because the application would trap on many writes. Likewise, always logging all writes (and not just reference writes) would be inefficient.

Most prior art collectors generally are most efficient in a particular system working with particular applications. It would be an advantage for a collector and it is an objective of the methods, processes and/or systems described herein to use more simple strategies that maintain efficiency over a range of systems, e.g. only handling changes.

SUMMARY

The above issues are handled by a from-space invariant system where the application operates on from-space and logs changes for the collector to scan and propagate or forward these changes to the to-space copies. However, the methods, processes and/or systems described herein provide advantages of tracking changes to header fields without restrictions, avoiding locks on individual operations, avoiding additional handshaking coordination between collector and applications, making use of virtual memory protection to minimize the impact on the application so that reference modifications are only tracked during those periods when there is a need to, and minimizing the use of barriers or traps, all within the confines of an incremental concurrent copying collector method and/or system with a bounded collection space.

The above limitations in the prior art and the benefits of the methods, processes and/or systems described herein are achieved by write protecting memory pages that overlap only a collection set. Any application that modifies objects in the collection set and the corresponding memory page traps to a handler. The corresponding memory pages are flagged in a byte map (or bit map) having at least one entry per memory page. At this point the memory page can be and is unprotected allowing the application to make the change to the object in from-space, and thereby reducing the number of traps occurring. Once the collector has write-protected the memory pages covering the collection set, it may copy objects from the collection set. Later, by using the bit map to identified modified pages, the collector propagates changes for evacuated objects on those pages.

Preferably the memory pages are virtual memory (VM) pages, and will be so labeled hereinafter since virtual memory pages are most commonly used. In a preferred embodiment using a Train algorithm, the VM page, is typically 8K bytes large, but smaller or much larger memory pages may be used. Generally the system and operating system will dictate the VM size. In the Train algorithm a typical arrangement is for a car to manage 128 KB of memory so there would be at least 16 VM pages identified that completely overlap the car, if a single car defines the collection set. Whatever the collection set the VM pages are identified to overlap completely the collection set.

"Trap" is a well known term of art where an operating sequence is diverted to an alternate sequence. Later the collector may suspend the application, read the modified map to identify the changed VM pages and propagate those changes to the relocated objects, and the application can resume. Here the impact on the application and the collector is minimal since the number of pages protected is small and the write protection of an affected VM page operates only for the first write operation. The coordination and synchronizing is inherent in the use of memory protecting the VM page and the map combination.

In a preferred embodiment, an incremental, concurrent collecting process can include the steps of defining one or more memory pages containing objects, creating a map with one or more map entries per memory page, write protecting the memory pages next to be collected to obtain one or more protected memory page, relocating reachable objects found in the memory pages, in response to a write to the protected memory page occurring in an application, setting a corresponding map entry, and un-protecting the protected memory pages and making changes corresponding to the write, then suspending the application, scanning the map, and propagating the changes to the relocated objects.

The memory pages can be virtual memory pages. The collecting process can employ the Train algorithm, wherein a collection set defines at least one car and defines a range of memory locations. The collecting process can include a step of arranging and defining a number of memory pages to overlap the range of memory locations to cover the collection set. Upon propagating the changes, the application can resume. Embodiments can include electromagnetic signals propagating on a computer network and/or computer readable media that can carry instructions for execution on one or more processors for the practice of the collecting process.

In other embodiments, an incremental, concurrent collecting process can include, in a mutator, the steps of setting a corresponding map entry in a first map in response to a write to a protected memory page occurring in an application, wherein the protected memory page contains objects to be collected, and unprotecting the protected memory page and making changes corresponding to the write. The process can include, in a collector, write protecting one or more memory pages next to be collected to obtain protected memory pages, relocating reachable objects found in the memory pages, copying entries set in the first map into a second map, scanning the second map, and propagating the changes to the relocated objects, performing a number of scanning passes of the second map, suspending the application when one or more criteria for ending the scanning passes is met, scanning the first map, and propagating the changes to the relocated objects, relocating remaining reachable objects found in the memory pages, and providing for resuming the application.

Copying entries can include setting an index to a start location of the first map, reading a word from the first map beginning at a location corresponding with the index, and atomically replacing the word with zeros in the first map. If atomically replacing the word is successful, the process can include writing contents of the reading into a location on the second map corresponding with the index, incrementing the index to a next word of the first map, returning to reading if the index does not correspond with an end of the first map, and re-write protecting the at least one memory page if the index corresponds with the end of the first map. If atomically replacing the word is not successful, the process can return to reading a word from the first map.

Atomically replacing the word can guarantee that an intervening store does not occur in any part of the word between the time it is read and the time its contents are replaced with zeros, and can include a compare-and-swap operation. Write protecting can be performed on a page-by-page basis, such that pages whose flags in the first map indicate that they have not been modified are not re-write protected. The process can defer copying portions of objects when those portions are contained in a page whose flag in either the first or second map indicate that the page is marked as being modified until that modified page is processed to propogate changes in forwarded objects on the page. Pages whose flags are marked as modified in the second map may be skipped if their corresponding flags in the first map have subsequently been set to indicate that their contents are modified.

The criteria for ending the scanning passes can include reaching a minimum number of memory pages for each pass, reaching a maximum number of passes, and/or reaching a desired number of modified pages. Embodiments can include electromagnetic signals propagating on a computer network carrying, and/or computer readable media containing, instructions for execution on one or more processors for the practice of the process.

Embodiments can include an incremental, concurrent collector including one or more memory pages containing objects to be collected, a map with one or more entries per memory page, means for write protecting the memory pages next to be collected, a handler, initiated after a write to protected memory occurred in an application, for setting a corresponding map entry indicating the memory page containing the object changed by the write and unprotecting that memory page and making changes corresponding to the write, and means for suspending the application, scanning the map, and propagating the changes to relocated objects.

The memory pages can be virtual memory pages. The collector can employ the Train algorithm, wherein a collection set can include one or more cars and can define a range of memory locations, and the collector can further include a number of memory pages arranged and constructed to completely overlap the range of memory locations to cover the collection set. Embodiments can include computer readable media containing instructions for execution of the collector in one or more processors. Electromagnetic signals propagating on a computer network can carry instructions for execution of the collector on one or more processors.

Further embodiments can include an incremental, concurrent collector for collecting a generation. The collector can include a mutator and a collector. The mutator can include means for setting, in response to a write to a protected memory page occurring in an application, a corresponding map entry in a first map, wherein the protected memory page contains objects to be collected, and means for unprotecting the protected memory page and making changes corresponding to the write. The collector can include means for write protecting one or more memory pages next to be collected to obtain the protected memory page, means for relocating reachable objects found in the memory pages, means for copying entries set in the first map into a second map, means for scanning the second map, and propagating the changes to the relocated objects, means for performing a number of scanning passes of the second map, means for suspending the application when one or more criteria for ending the scanning passes is met, means for scanning the first map, and propagating the changes to the relocated objects, means for relocating remaining reachable objects found in the memory pages, and means providing for the resumption of the application.

The means for copying entries can include means for setting an index to a start location of the first map, means for reading a word from the first map beginning at a location corresponding with the index, means for atomically replacing the word with zeros in the first map, means for writing contents of the reading into a location on the second map corresponding with the index, means for incrementing the index to a next word of the first map, and means for re-write protecting the memory pages.

The criteria for ending the scanning passes can include reaching a minimum number of memory pages for each pass, reaching a maximum number of passes, and/or reaching a desired number of remaining modified memory pages. Embodiments can include electromagnetic signals propagating on a computer network carrying instructions for execution of the collector on one or more processors.

The following advantages are provided: the maximum size of the collection set can be bounded, such that the maximum number of VM pages that need to be covered by VM protection can be bounded; the size of the modified map can be bounded in that it need only cover the maximum number of protected VM pages; the write protected memory typically being less than 10% of the heap; the memory protection is only incurred during collections and it is coordinated with the application without the relatively expensive handshaking and status checking of other techniques; all the mutations to the collection set are captured while allowing the application to make any changes to header field without complicating requirements; re-linked rather than relocated objects need not be protected; and the rescan and propagate phase of GC threads can occur when the application suspends, and threads need little synchronization due to the fact that the application's threads are inactive.

BRIEF DESCRIPTION OF THE DRAWINGS

The description below refers to the accompanying drawings, of which:

FIGS. 12A-12J, discussed above, are diagrams that illustrate a collection scenario that can result from using the Train algorithm;

DETAILED DESCRIPTION OF ILLUSTRATIVE EMBODIMENTS

The embodiment now to be discussed recognizes that there are some cars that will not employ write-protection. For example, special cars managing popular or oversized objects that will be evacuated by relinking rather than by copying need no additional logging of modifications. Similarly, a subset of normal cars, e.g., those currently being used for direct allocation of objects in the generation by the application, may be exempted both from being write-protected as well as from concurrent copying operations. In what follows, the embodiment can employ write-protected virtual memory pages to track all modifications to a chosen subset of normal and special (no-longer-popular) cars in the collection set whose objects will be evacuated by copying.

Figure 1:
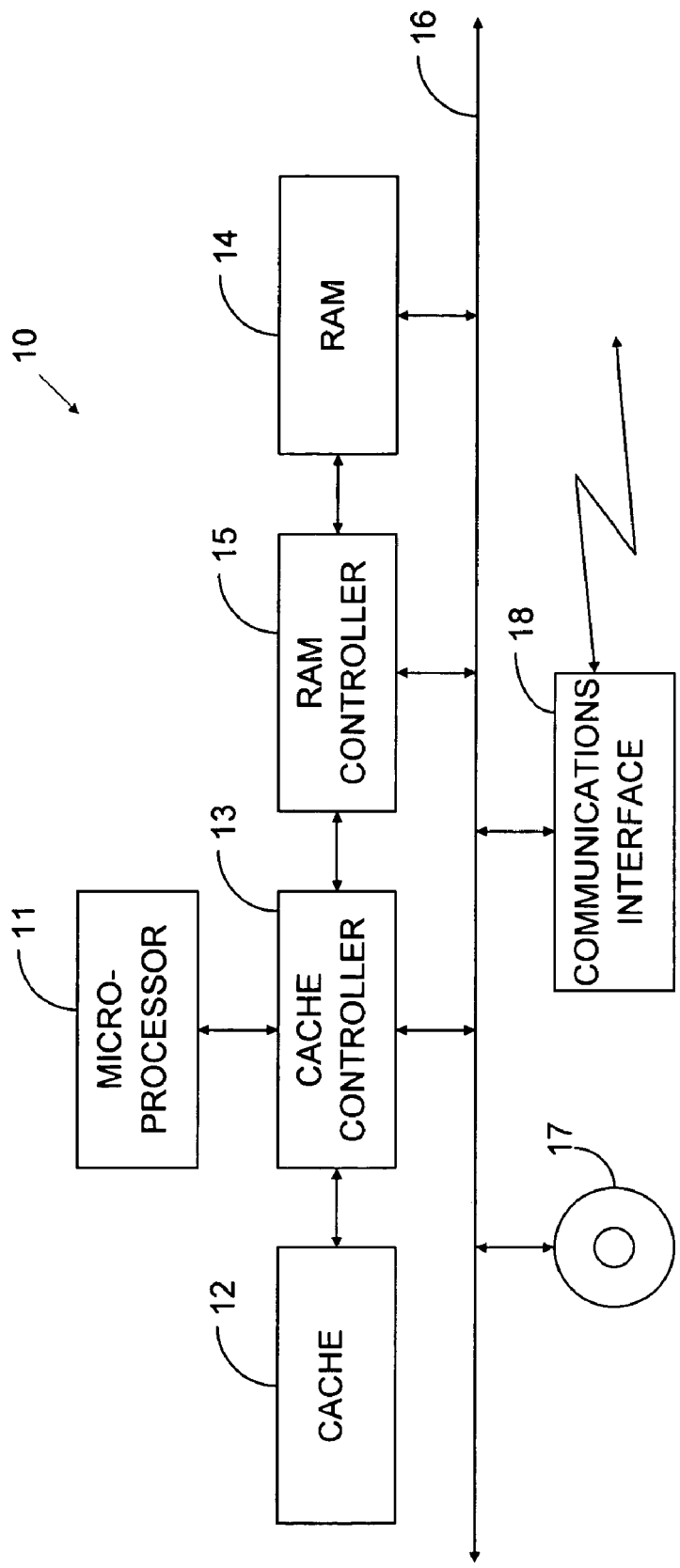
FIG. 1, discussed above, is a block diagram of a computer system in which the teachings herein can be practiced.
Figure 2:
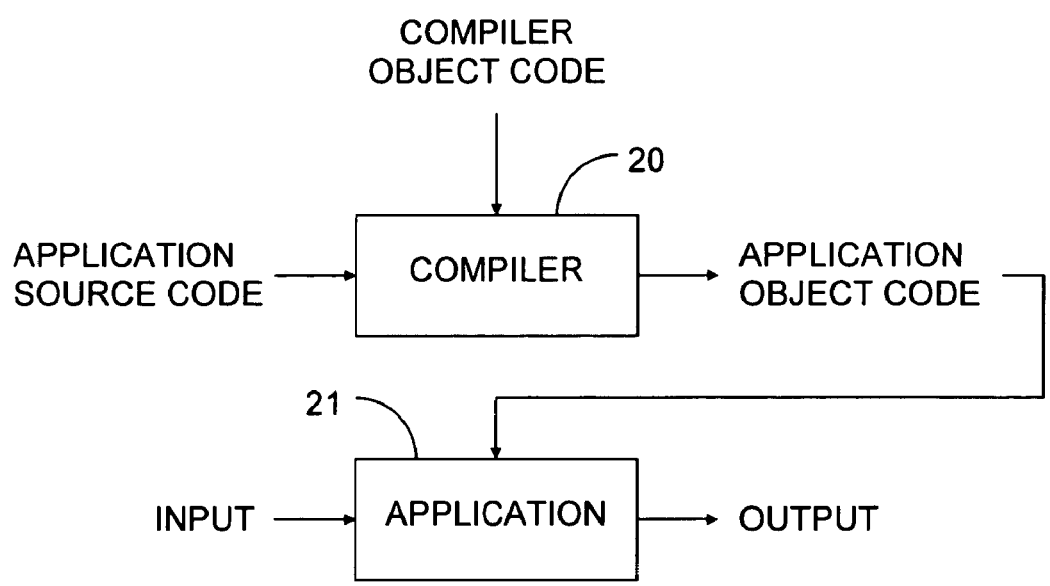
FIG. 2, discussed above, is a block diagram that illustrates a compiler's basic functions.
Figure 3:
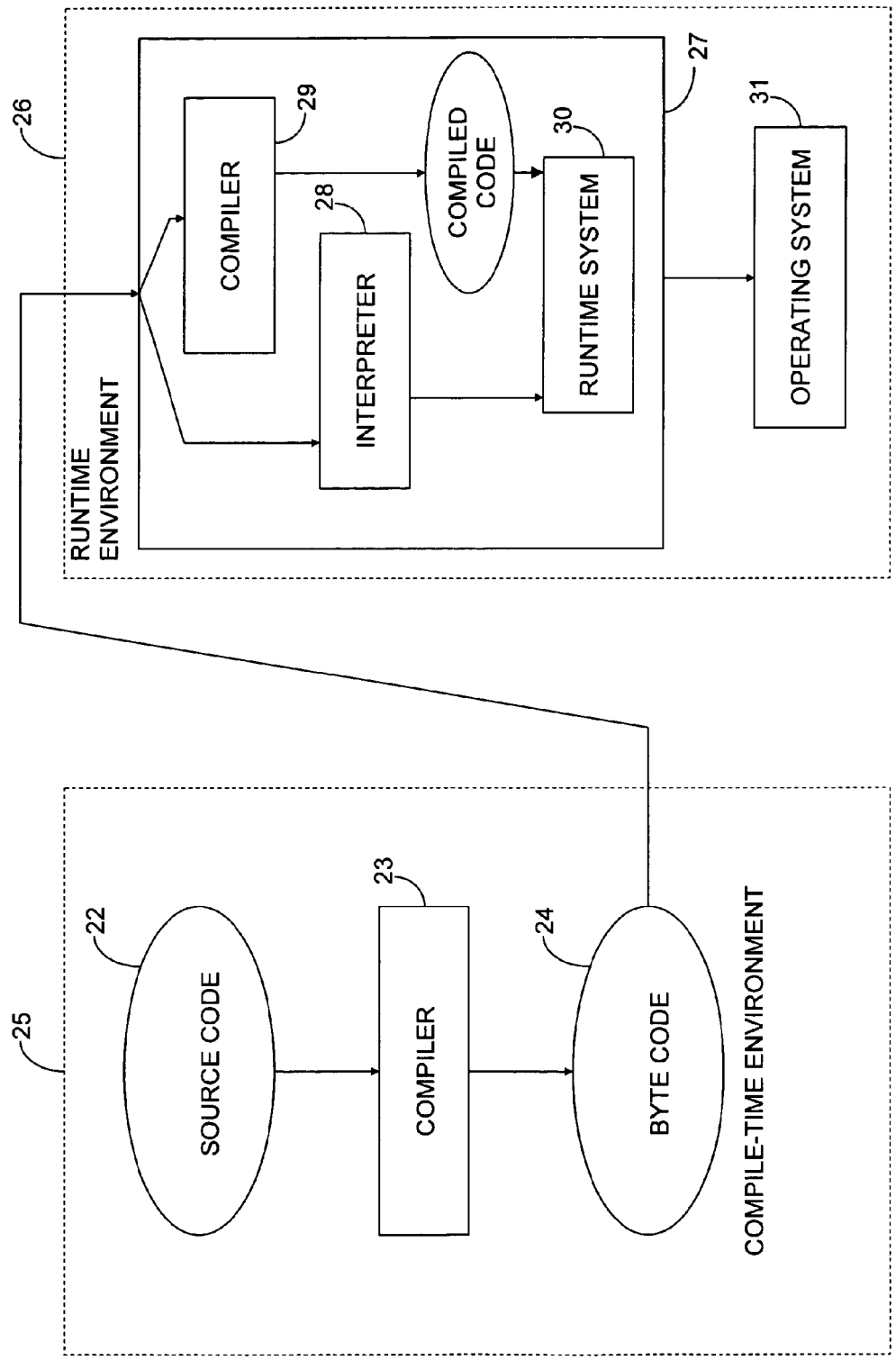
FIG. 3, discussed above, is a block diagram that illustrates a more-complicated compiler/interpreter organization.
Figure 4:
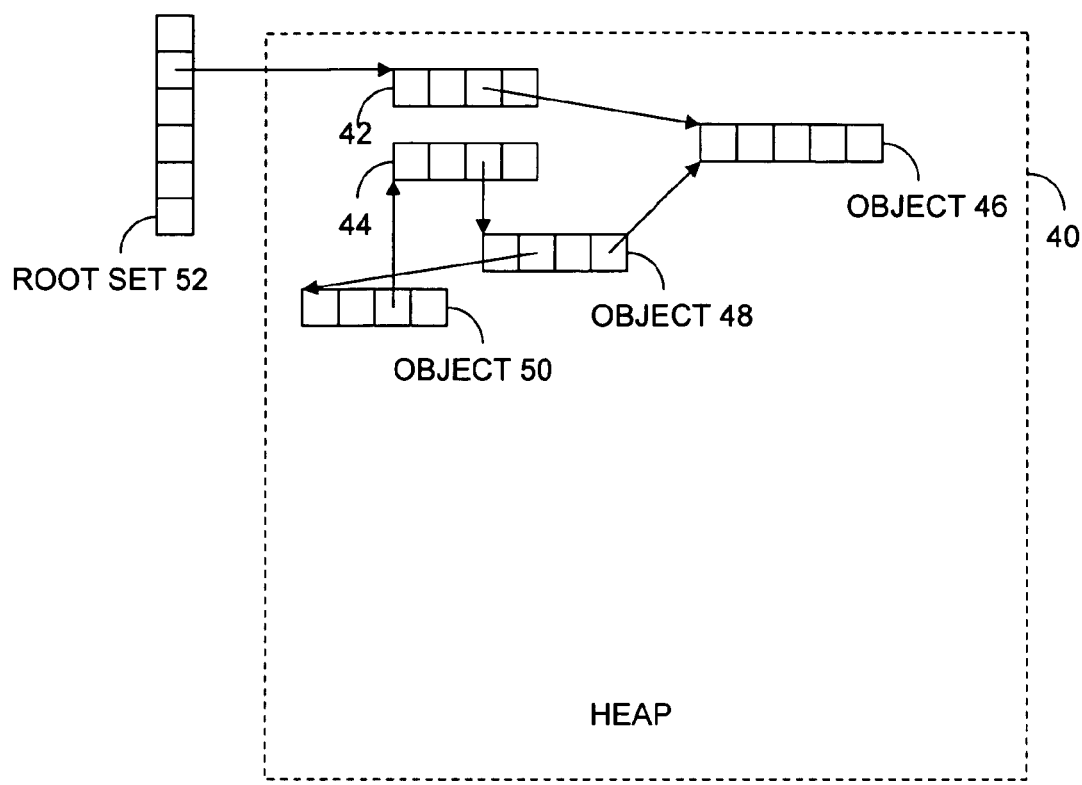
FIG. 4, discussed above, is a diagram that illustrates a basic garbage-collection mechanism.
Figure 5:
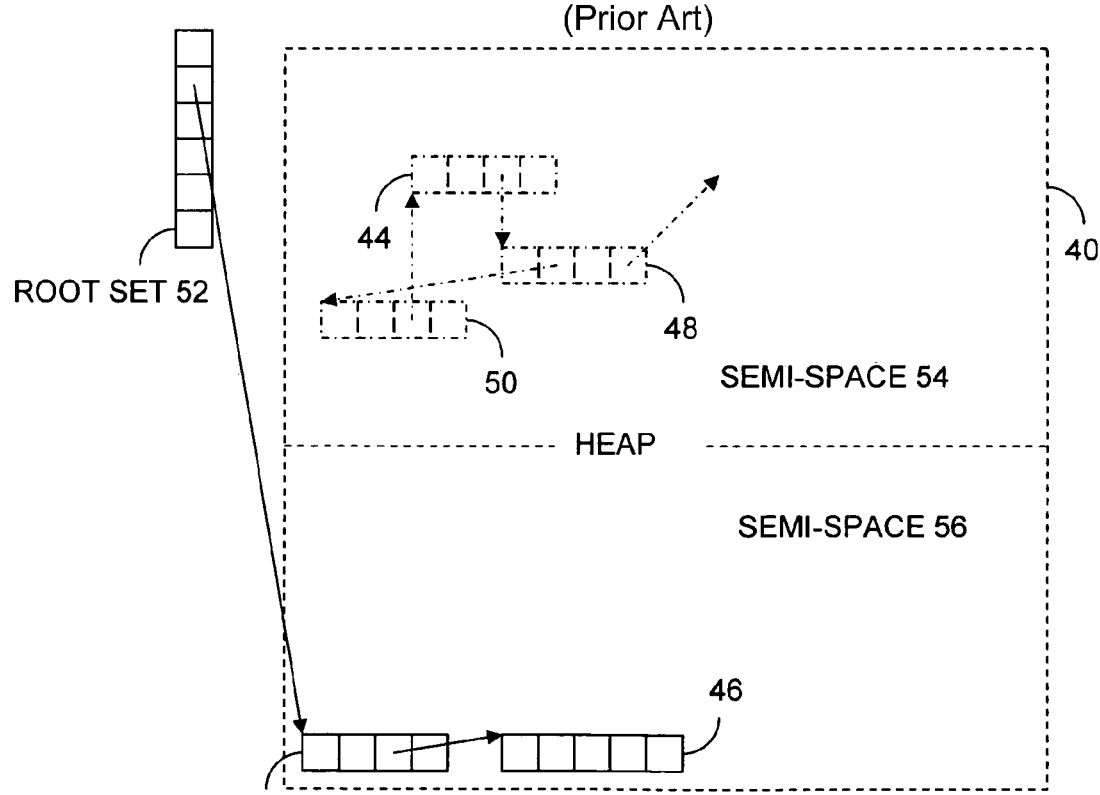
FIG. 5, discussed above, is a similar diagram illustrating that garbage-collection approach's relocation operation.
Figure 6:
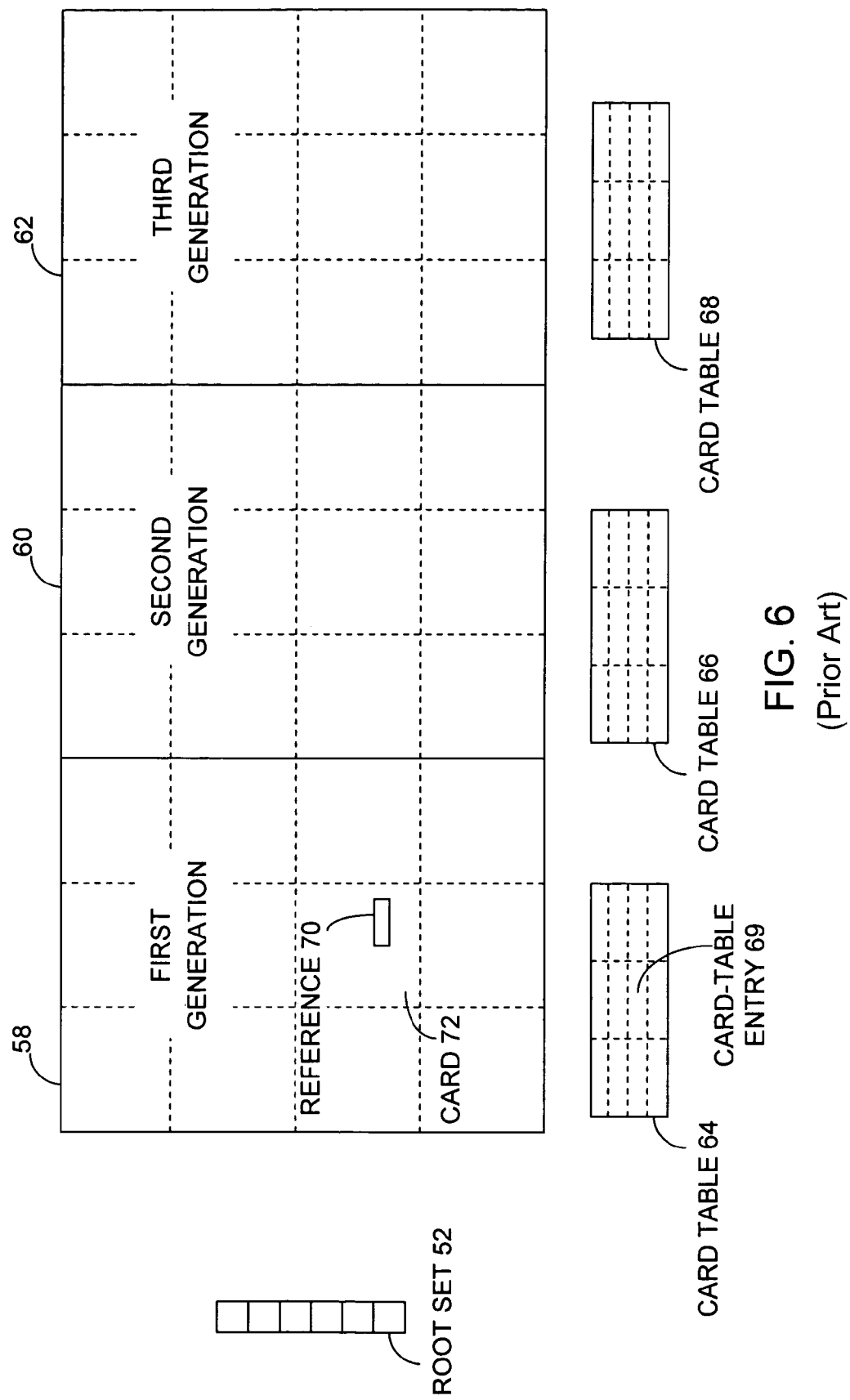
FIG. 6, discussed above, is a diagram that illustrates a garbage-collected heap's organization into generations.
Figure 7:
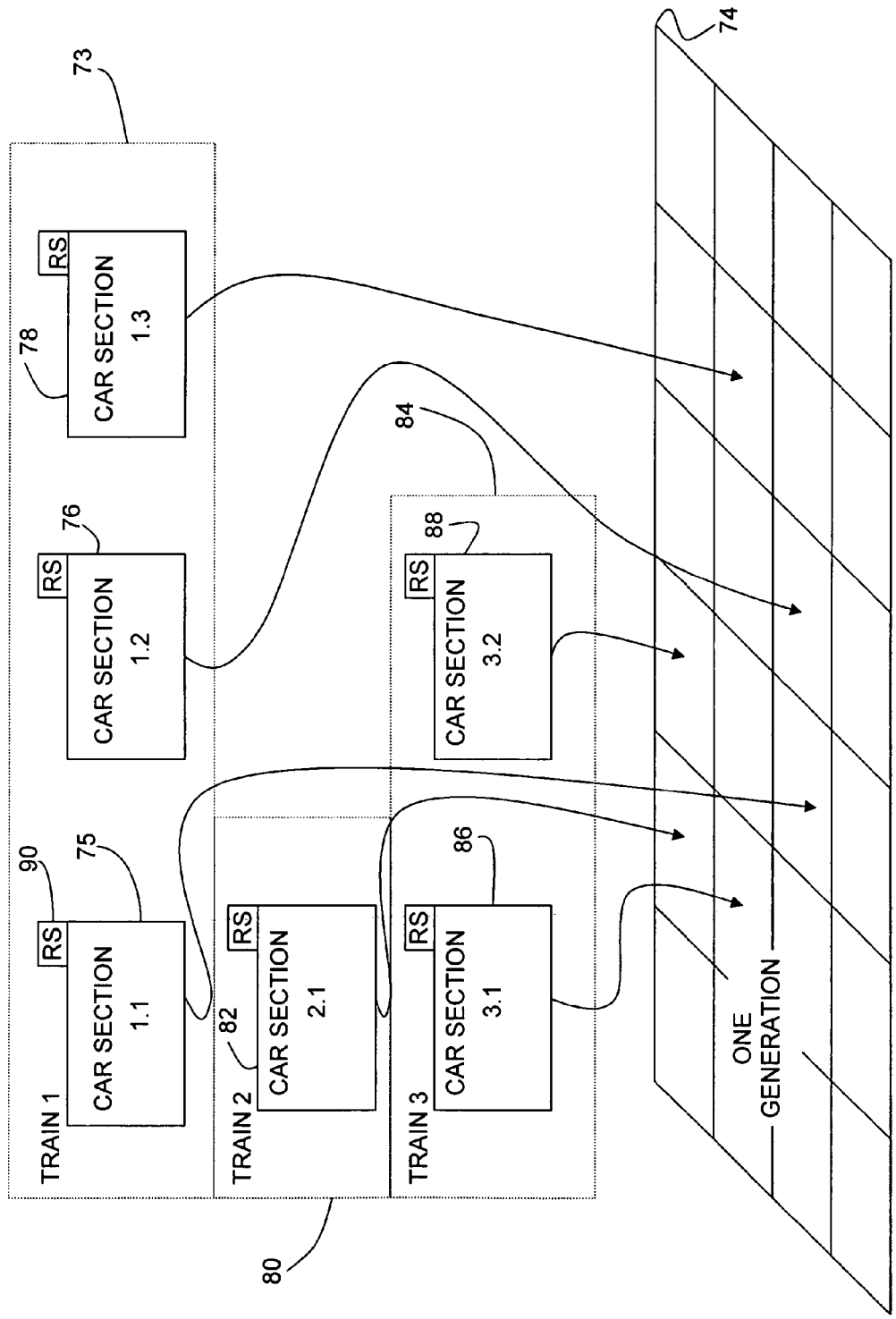
FIG. 7, discussed above, is a diagram that illustrates a generation organization employed for the Train algorithm.
Figure 8A:
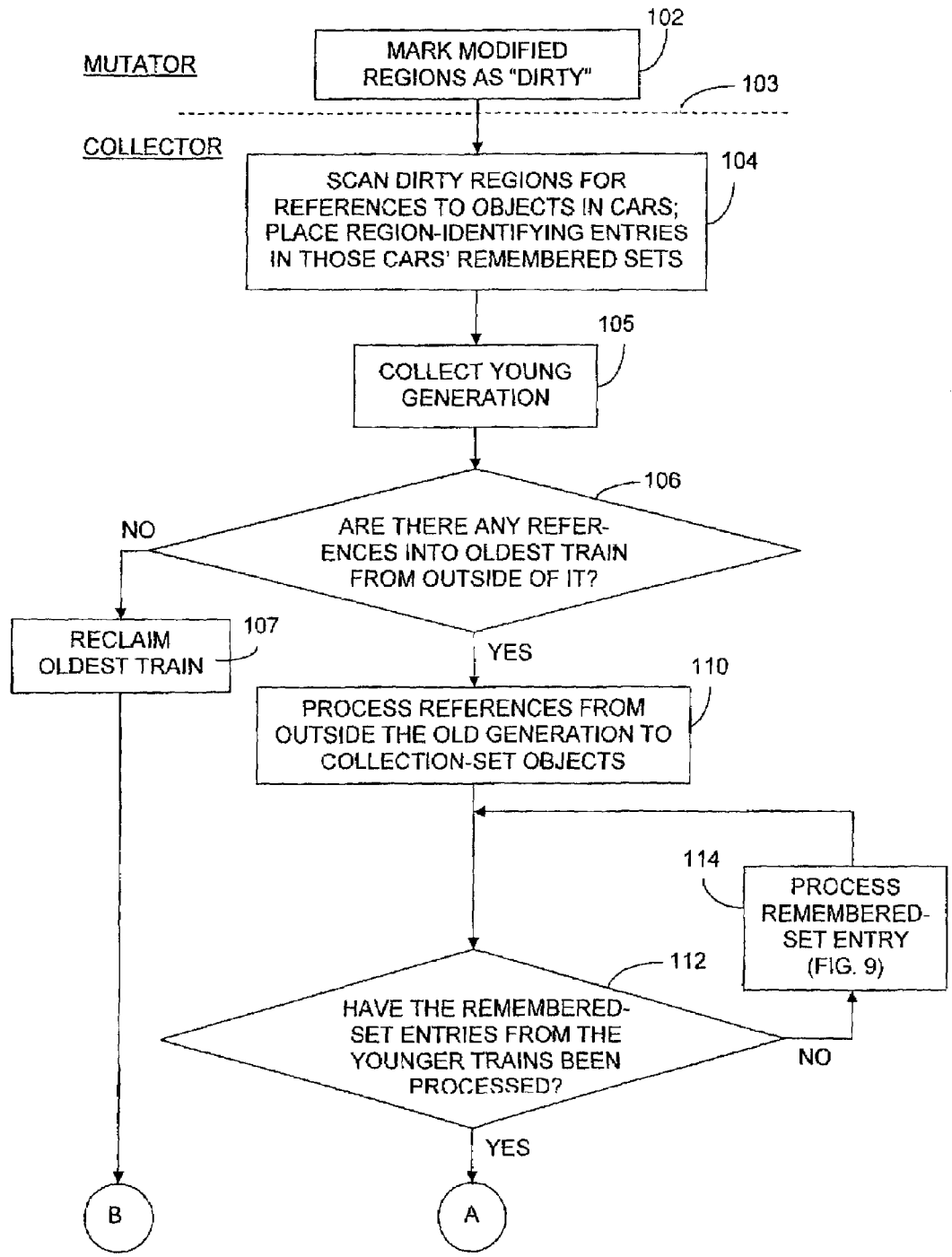
FIGS. 8A and 8B, discussed above, together constitute a flow chart that illustrates a garbage-collection interval that includes old-generation collection.
Figure 8B:
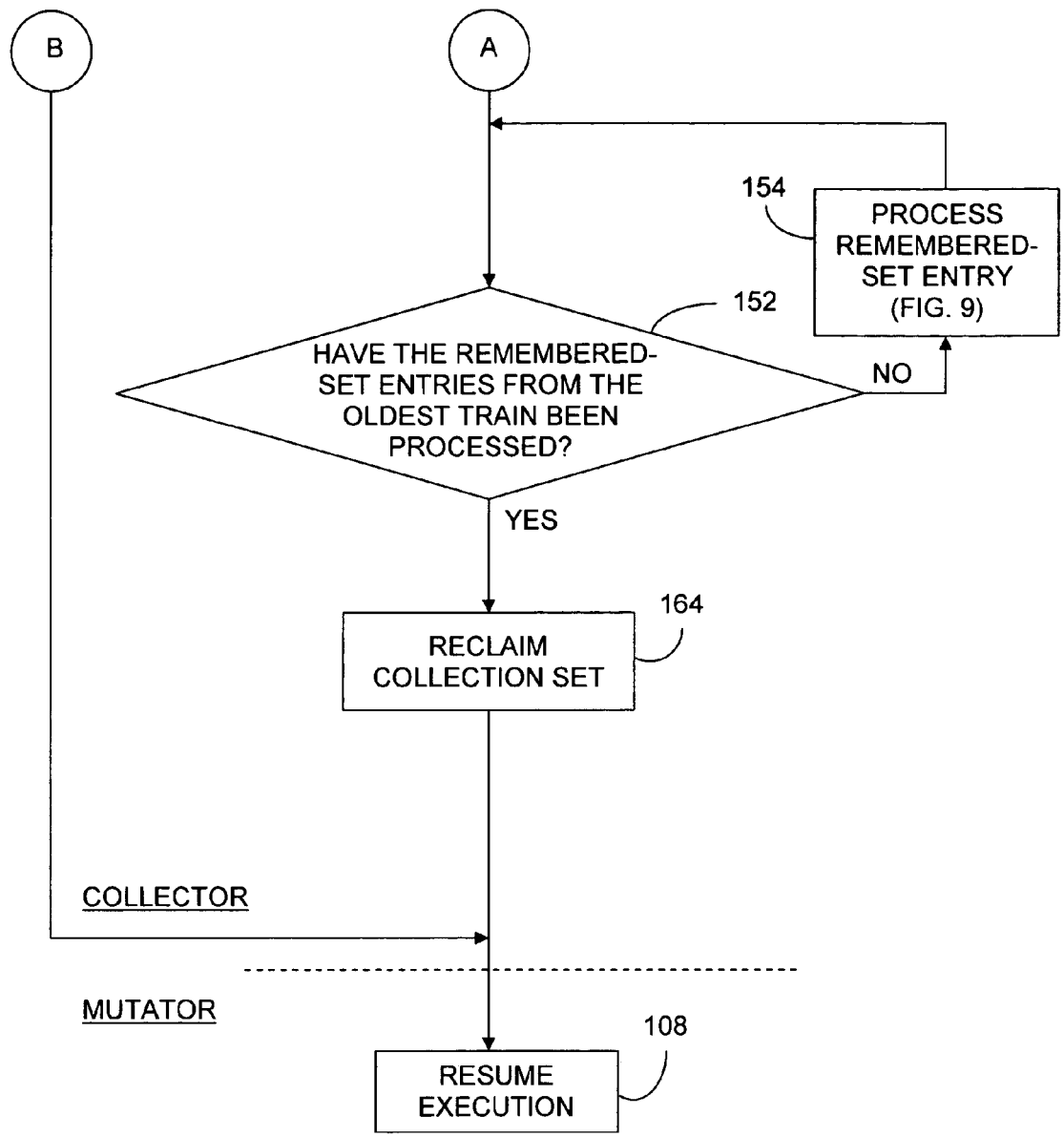
Figure 9:
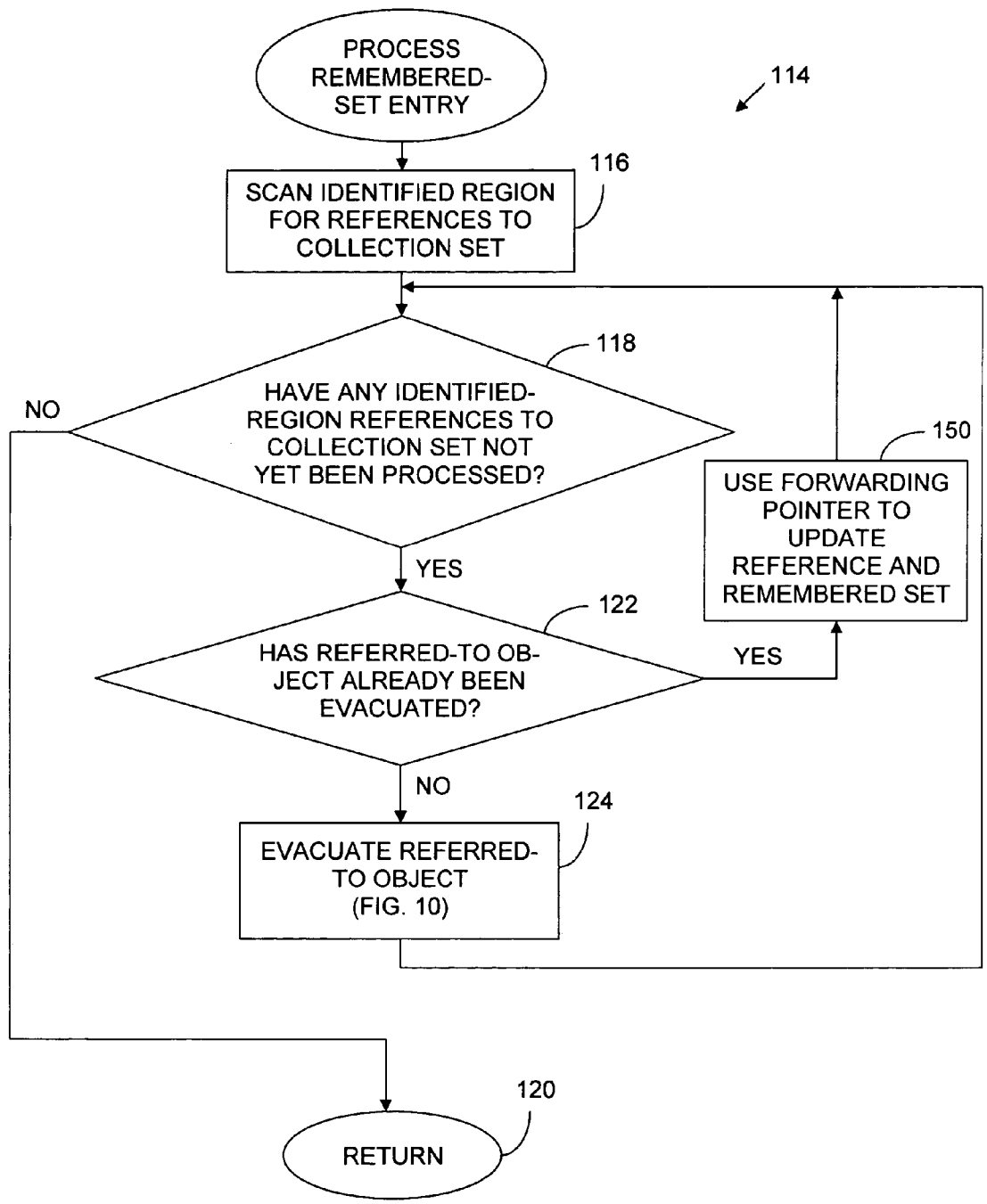
FIG. 9, discussed above, is a flow chart that illustrates in more detail the remembered-set processing included in FIG. 8A.
Figure 10:
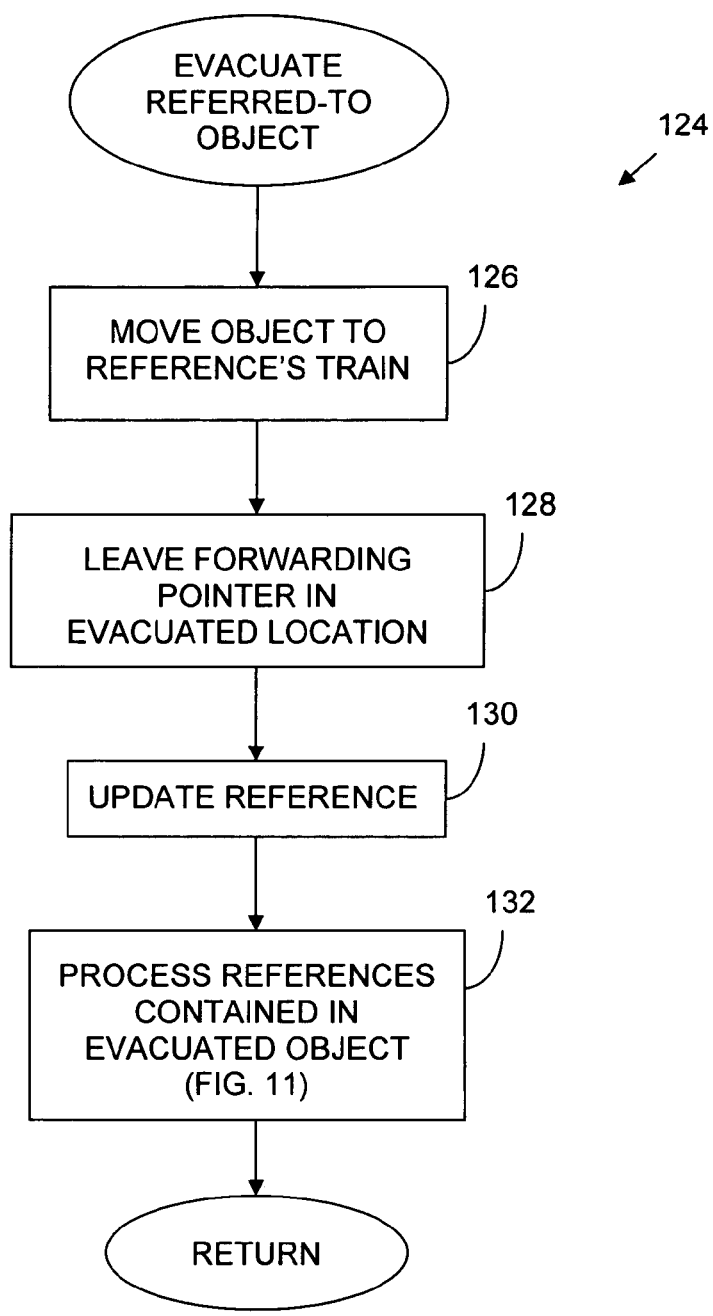
FIG. 10, discussed above, is a block diagram that illustrates in more detail the referred-to-object evacuation that FIG. 9 includes.
Figure 11A:
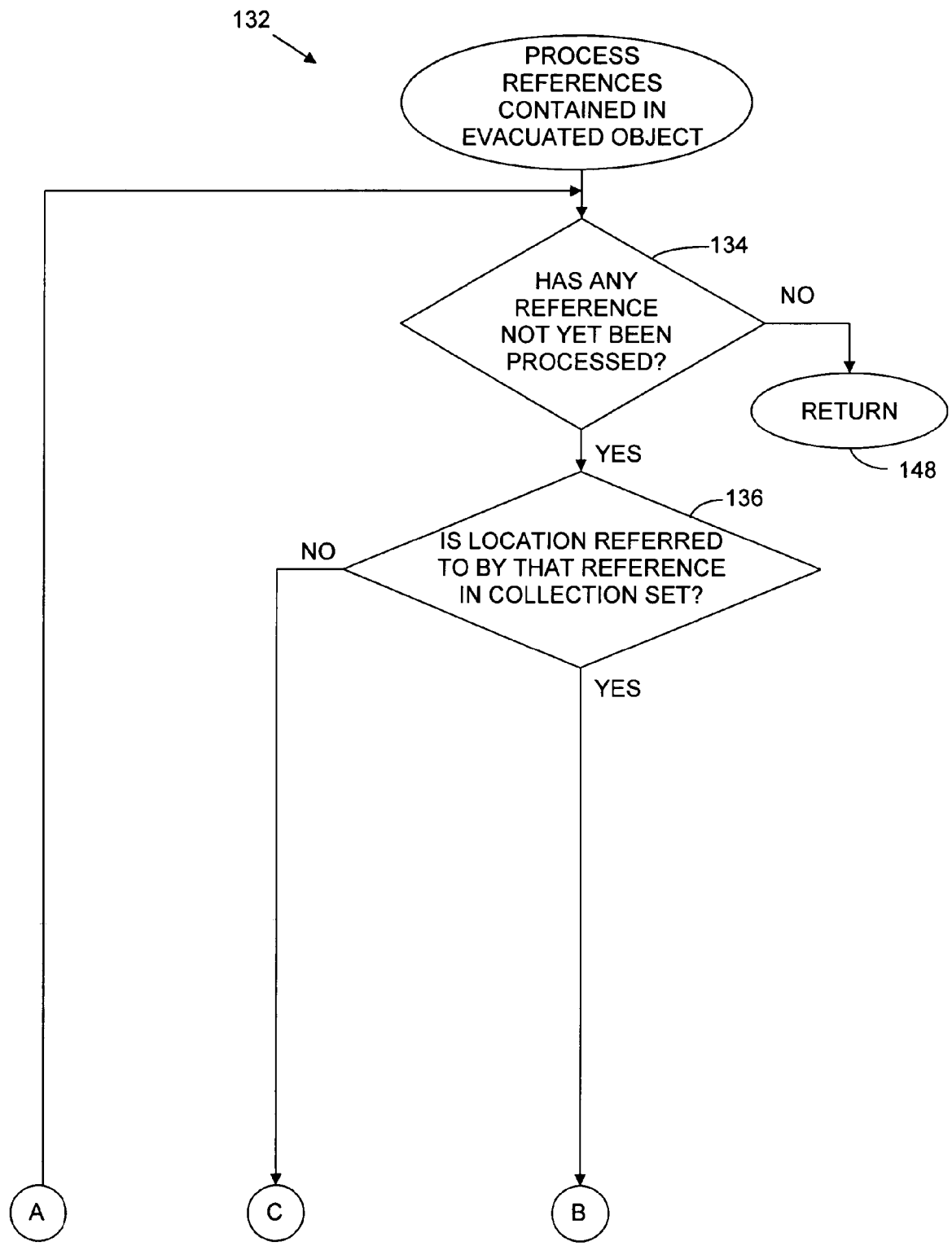
FIG. 11, discussed above, is a flow chart that illustrates in more detail the FIG. 10 flow chart's step of processing evacuated objects' references.
Figure 11B:
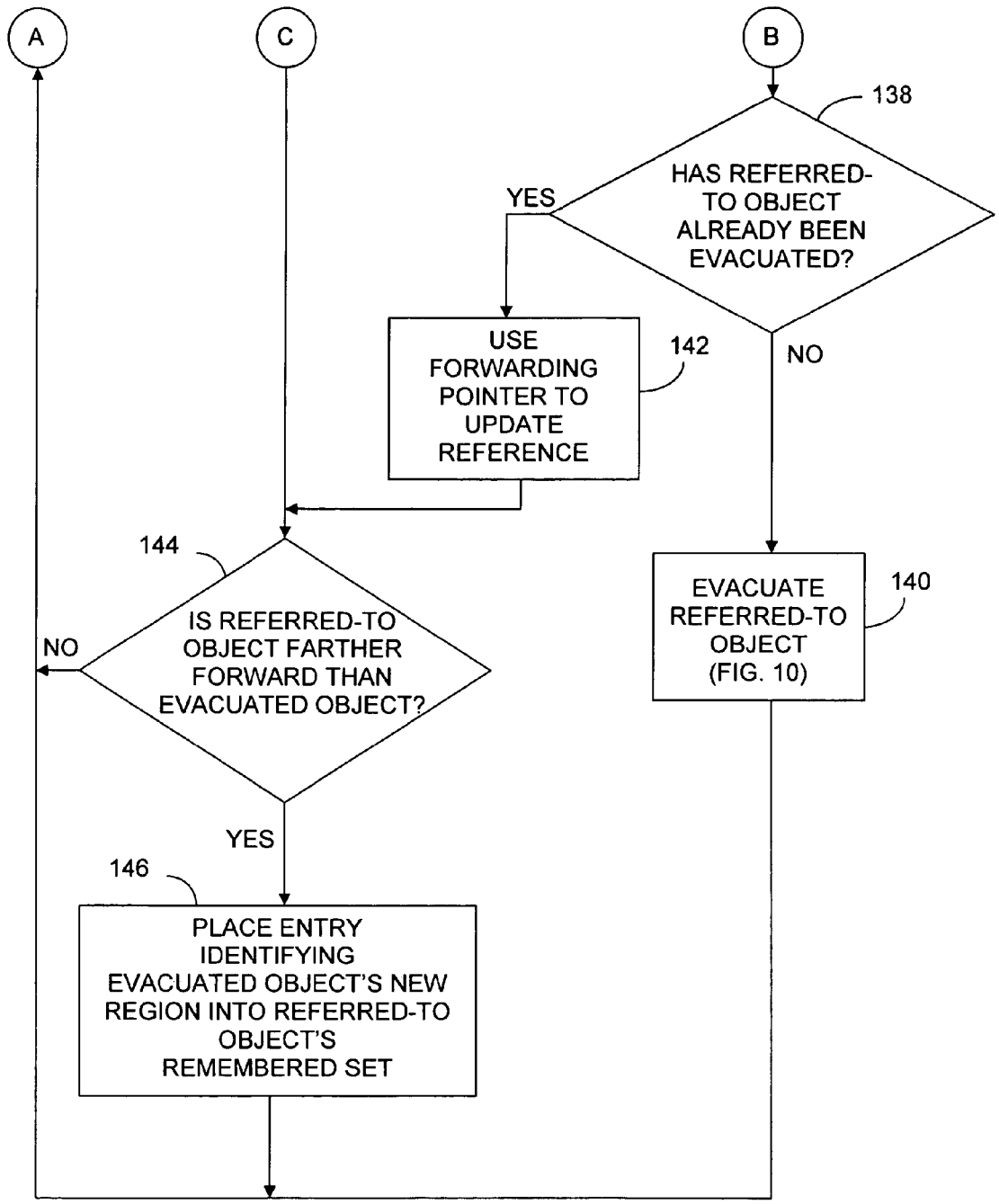
Figure 12A:
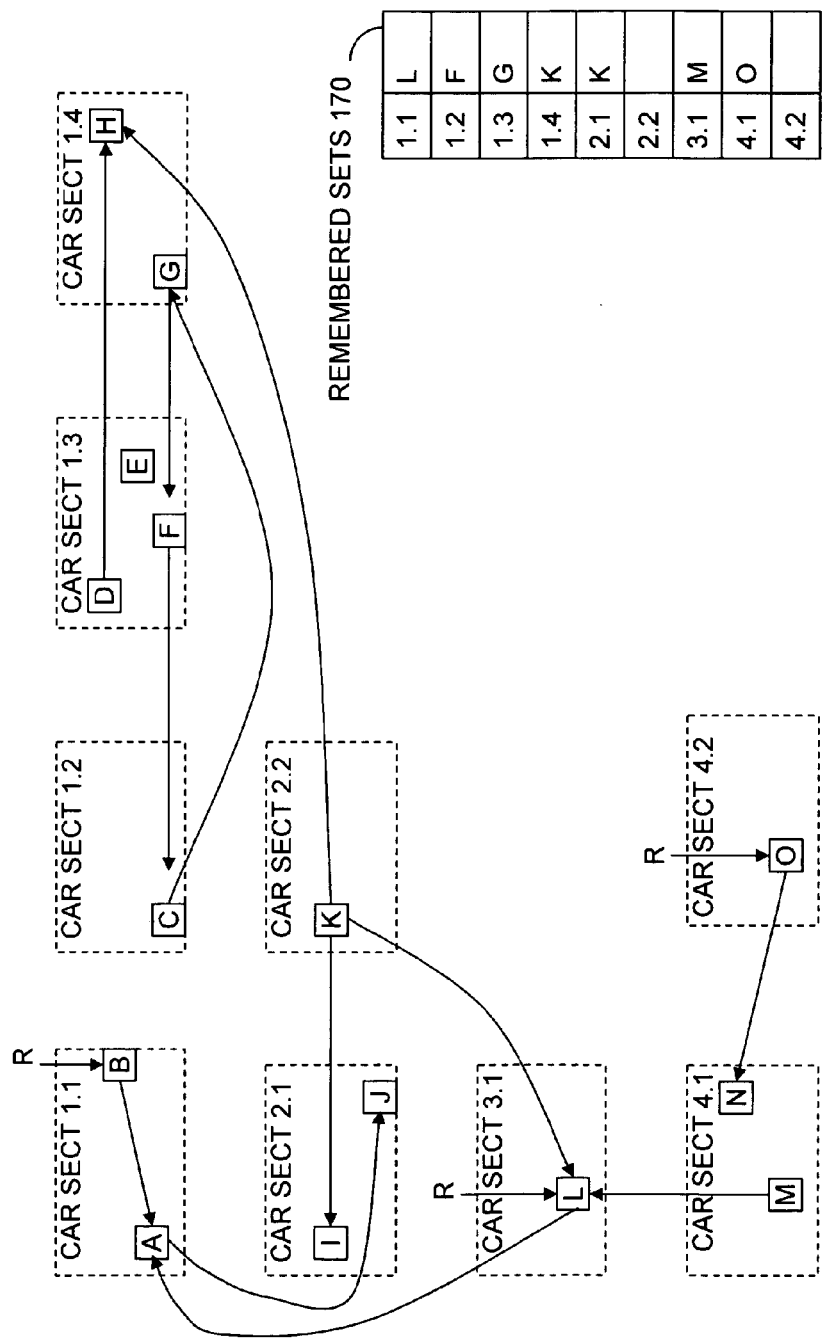
Figure 12B:
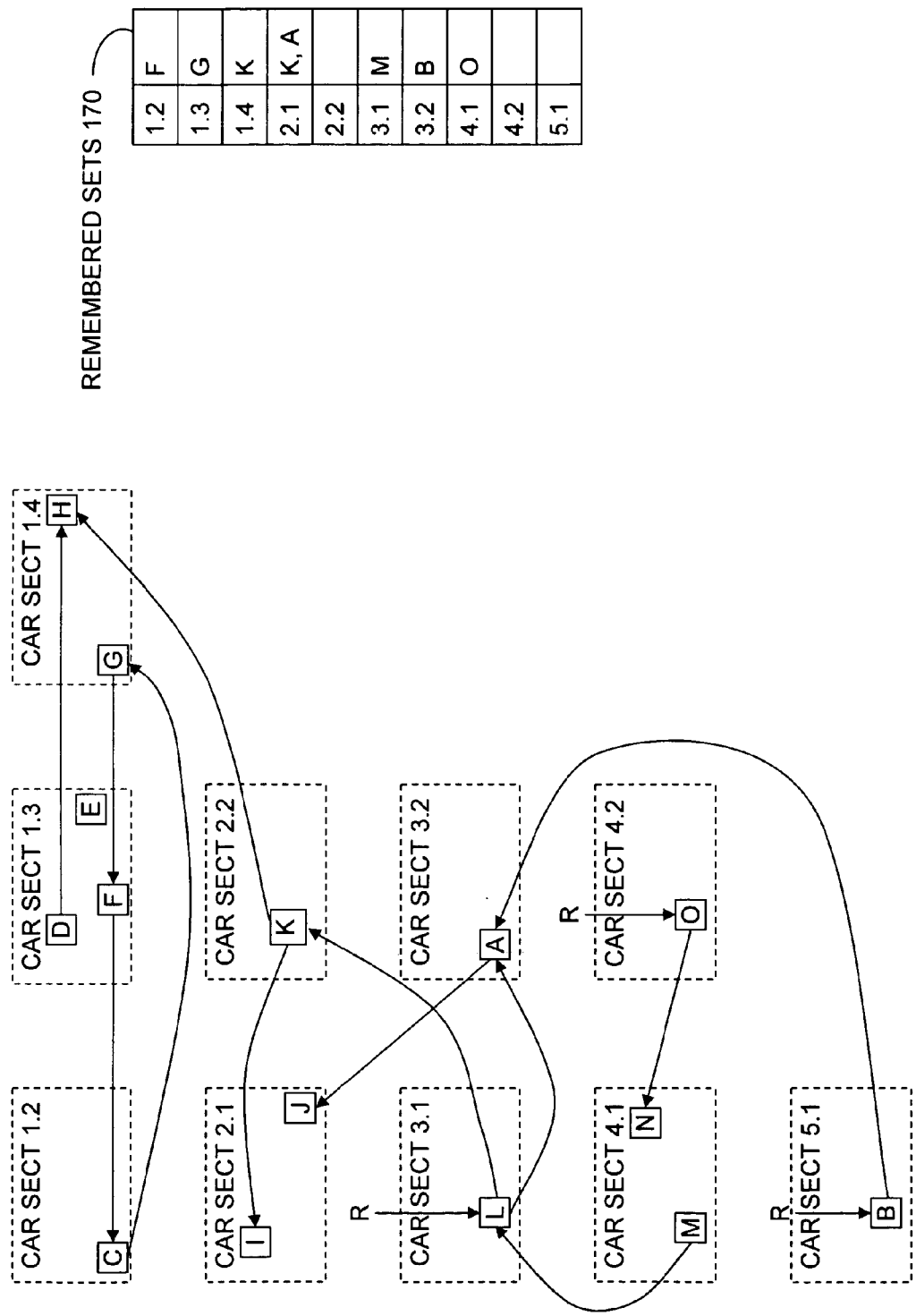
Figure 12C:
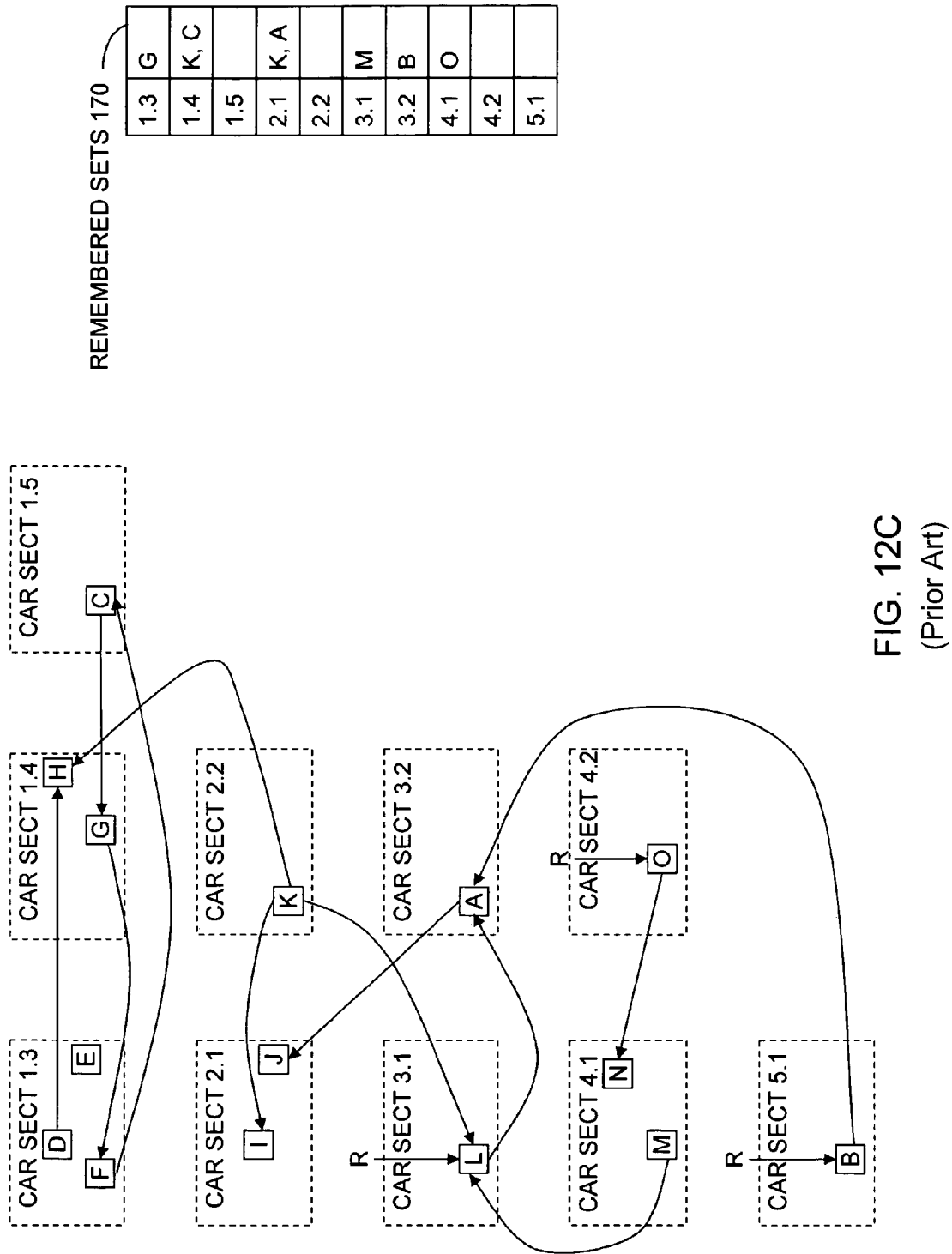
Figure 12D:
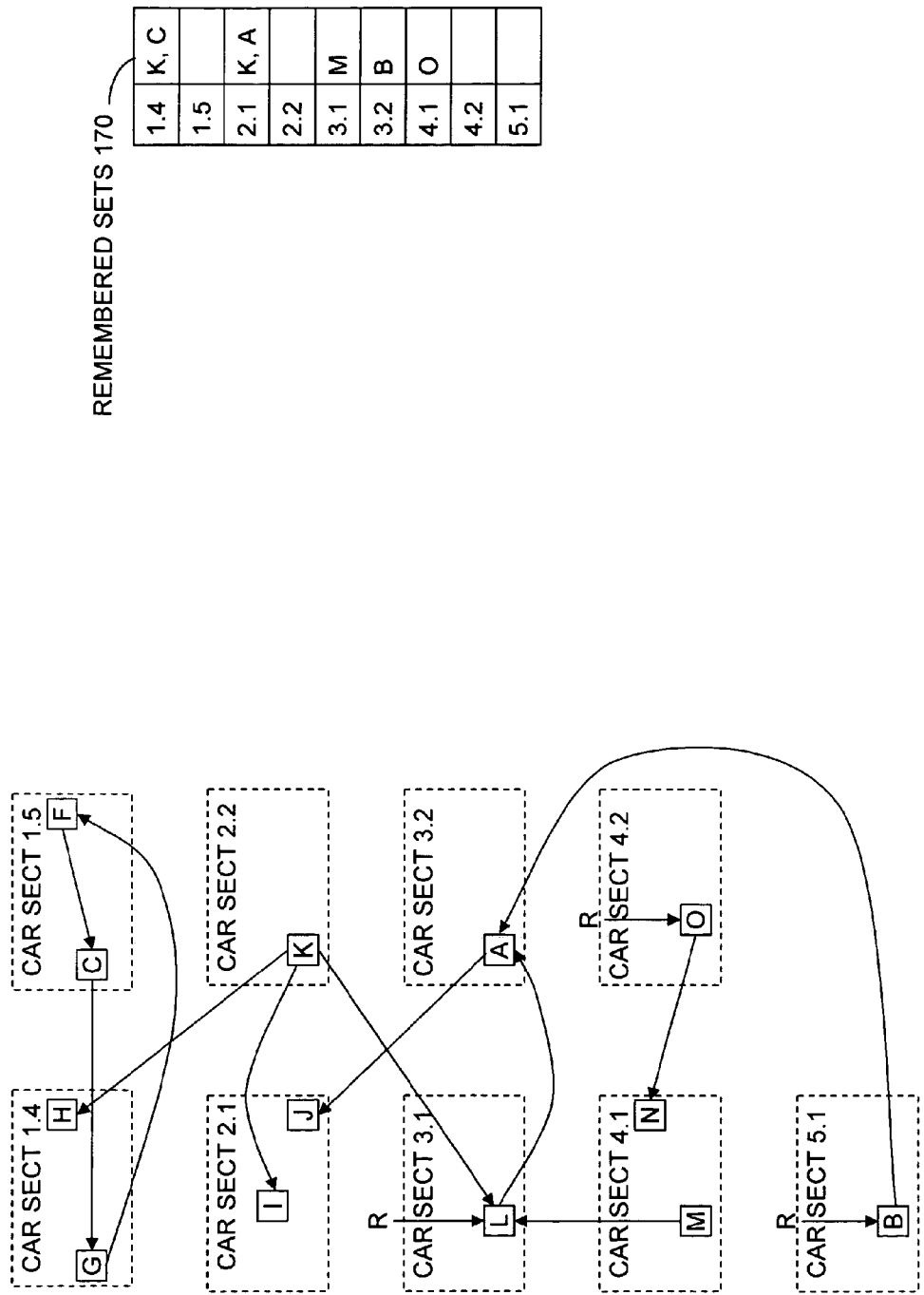
Figure 12E:
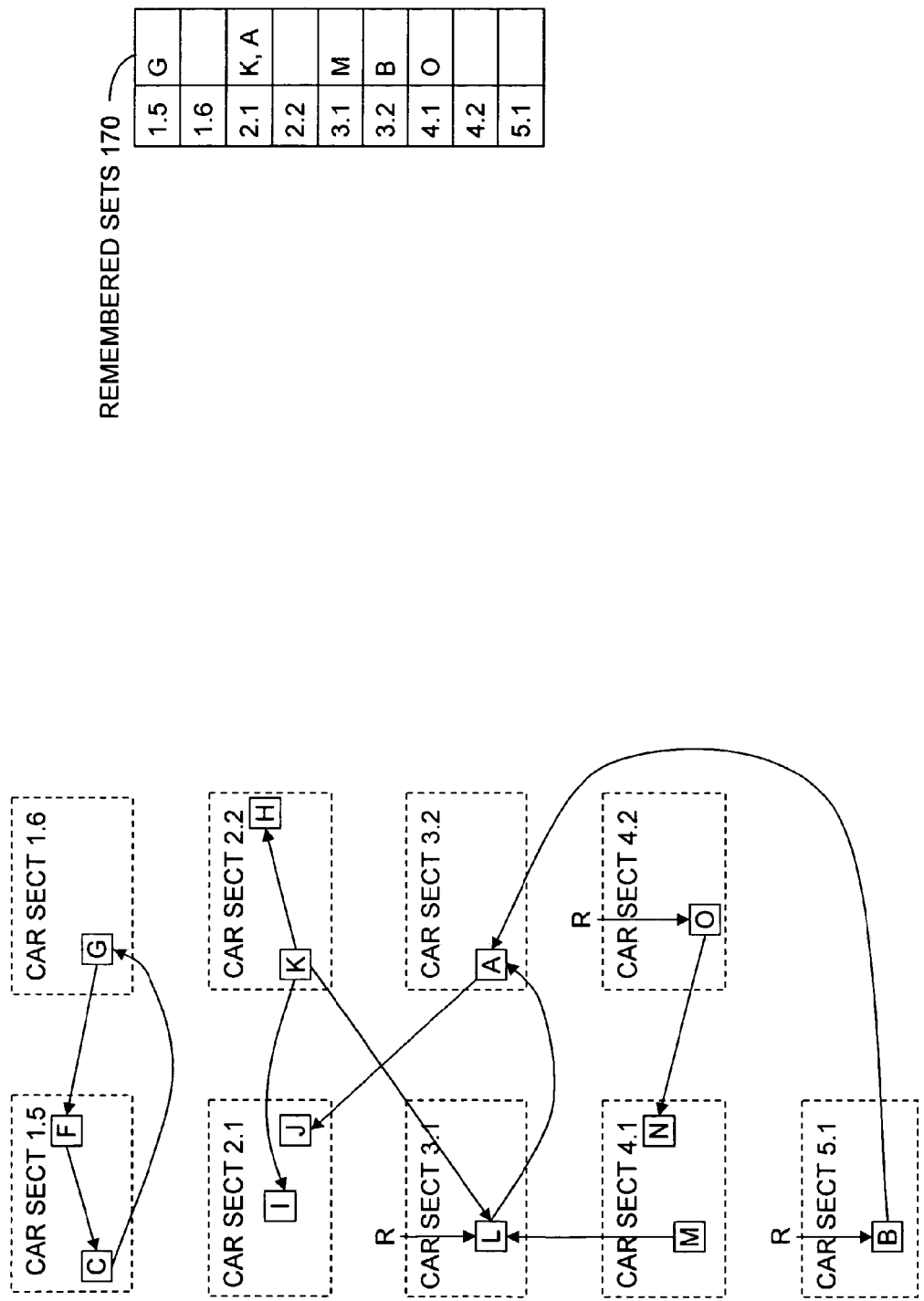
Figure 12F:
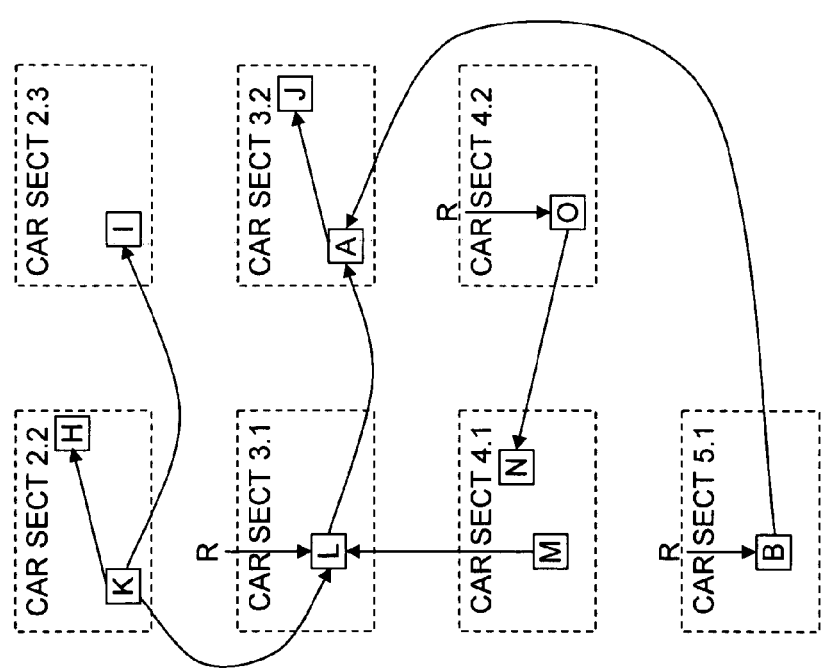
Figures 12I, 12J:
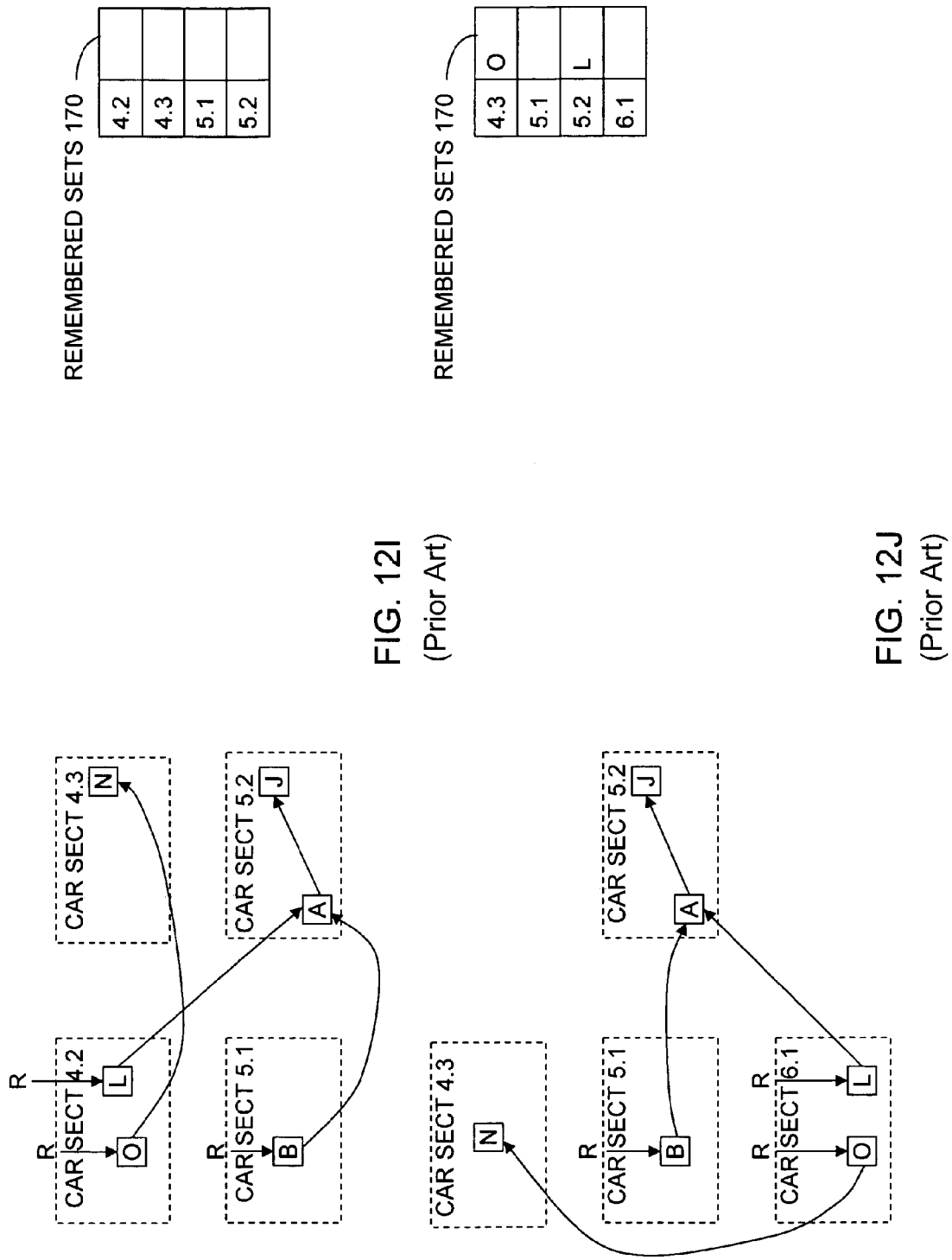
Figure 13:
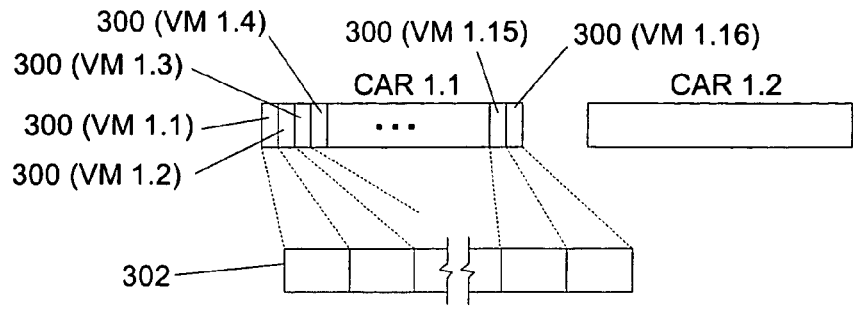
FIG. 13 a diagram of VM pages overlapping collection set car and a corresponding bit map.

FIG. 13 shows a string of cars in a train similar to the one in FIG. 7. Car 1.1 can be further divided into virtual memory VM pages 300 that can include, in this particular case, VM 1.1 to VM 1.16. The VM pages shown in FIG. 13 can be aligned with respect to the boundaries of the car sections but this need not be the case. The number of VM pages can be identified to cover an entire collection set. A byte or bit map 302 can be created, initially with zeros, with one entry for each VM page. Entries into the map can indicate that changes were made to objects in the corresponding VM page.

The following assumes, without loss of generality, that each collection set consists of a single car composed of sixteen, as in the case of FIG. 13, VM pages. When the concurrent copying phase of collection is initiated, the byte or bit map 302 is clear, i.e., initialized to zeros, and the collector can write-protect the VM pages comprising the part of the collection set subject to concurrent copying-based evacuation. A thread writing to objects in one of the write-protected pages can trap to a handler, where the address being written can be used to identify the corresponding VM page containing that address and to mark the byte or bit map 302 of that corresponding VM page. The VM page can then be unprotected and the application may make the modification by resuming execution at the trapping store instruction.

During this period, the collector can evacuate reachable objects from the collection set, either by relinking those that remain in special cars or by copying objects from cars whose car sections are write-protected. At some point, the collector can suspend the application, scan the map to identified VM pages containing modified data, and propagate these changes to their new locations outside the collection set. In addition, the collector can complete evacuation of objects in collection set cars not covered by the embodiment's use of virtual memory protection. Note that in propagating modifications to their new locations by recopying objects' contents on modified VM pages, the embodiment need only recopy those contents on those pages even if a given object extends across a VM page boundary.

Figure 14:
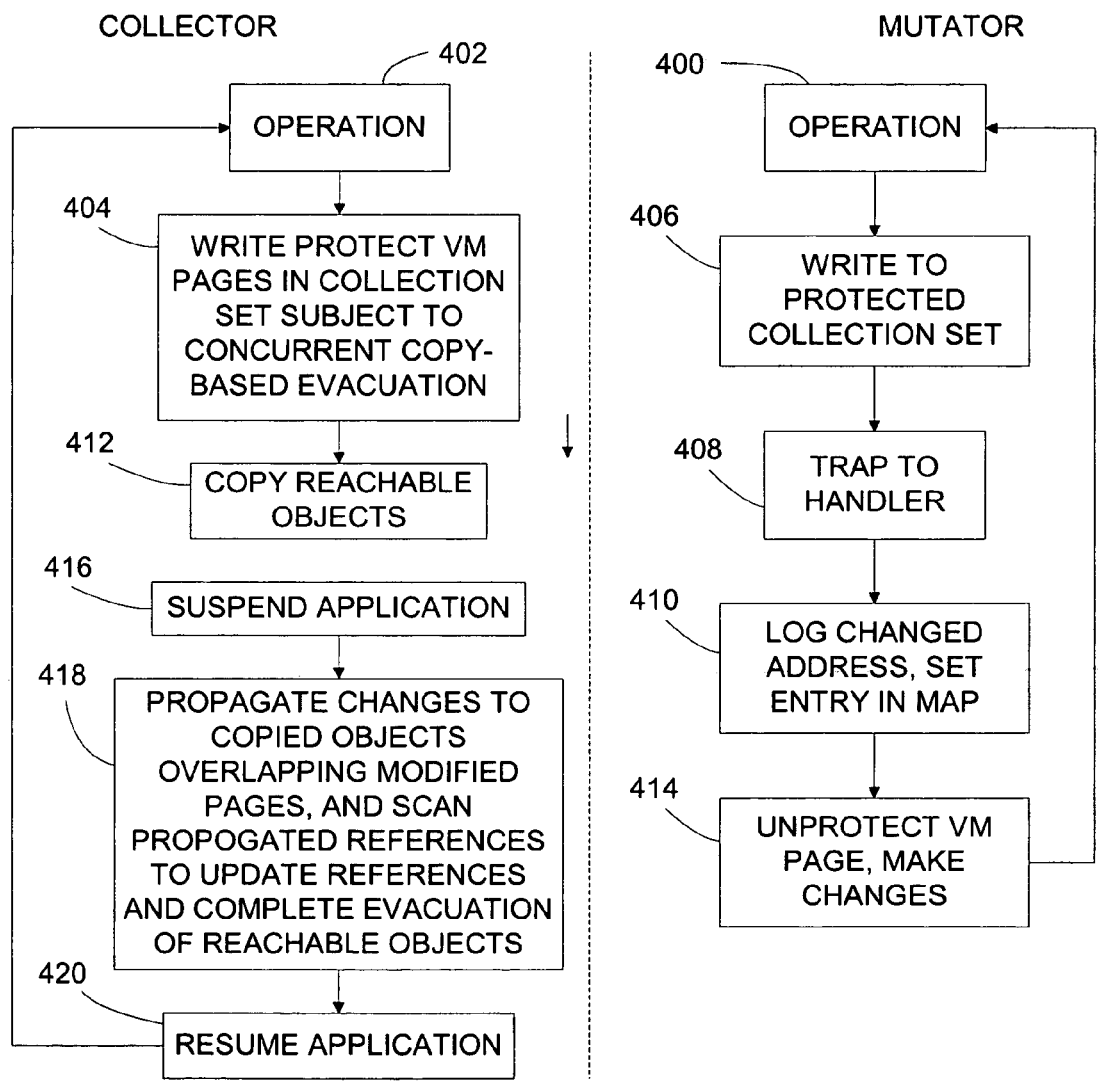
FIG. 14 is a flow chart of a collector and a concurrent application.

FIG. 14 is a flow chart of the collector using one byte map where the application operation 400 can be suspended at some point to propagate the changes to the relocated objects. When the collection is started 402, a collection set and corresponding VM pages can be write protected 404 and reachable objects can be evacuated, or copied 412, excepting those that are in cars not participating in concurrent copying-based evacuation as discussed above. If the application tries to write to an object in the write protected collection set 406 the system can trap 408. The changed address can be logged and an entry in the corresponding byte map (302 in FIG. 13) can be set 410. The corresponding VM page can be unprotected and the modification to the object in the collection set can be made 414. If the map has entries, the application can be suspended 416. The changes can be propagated to the copied objects and the propogated changes scanned for references into the collection-set so that any additional reachable objects may be evacuated and the references updated appropriately 418. The application can resume 420 and concurrent collecting can continue 402.

Figure 15:
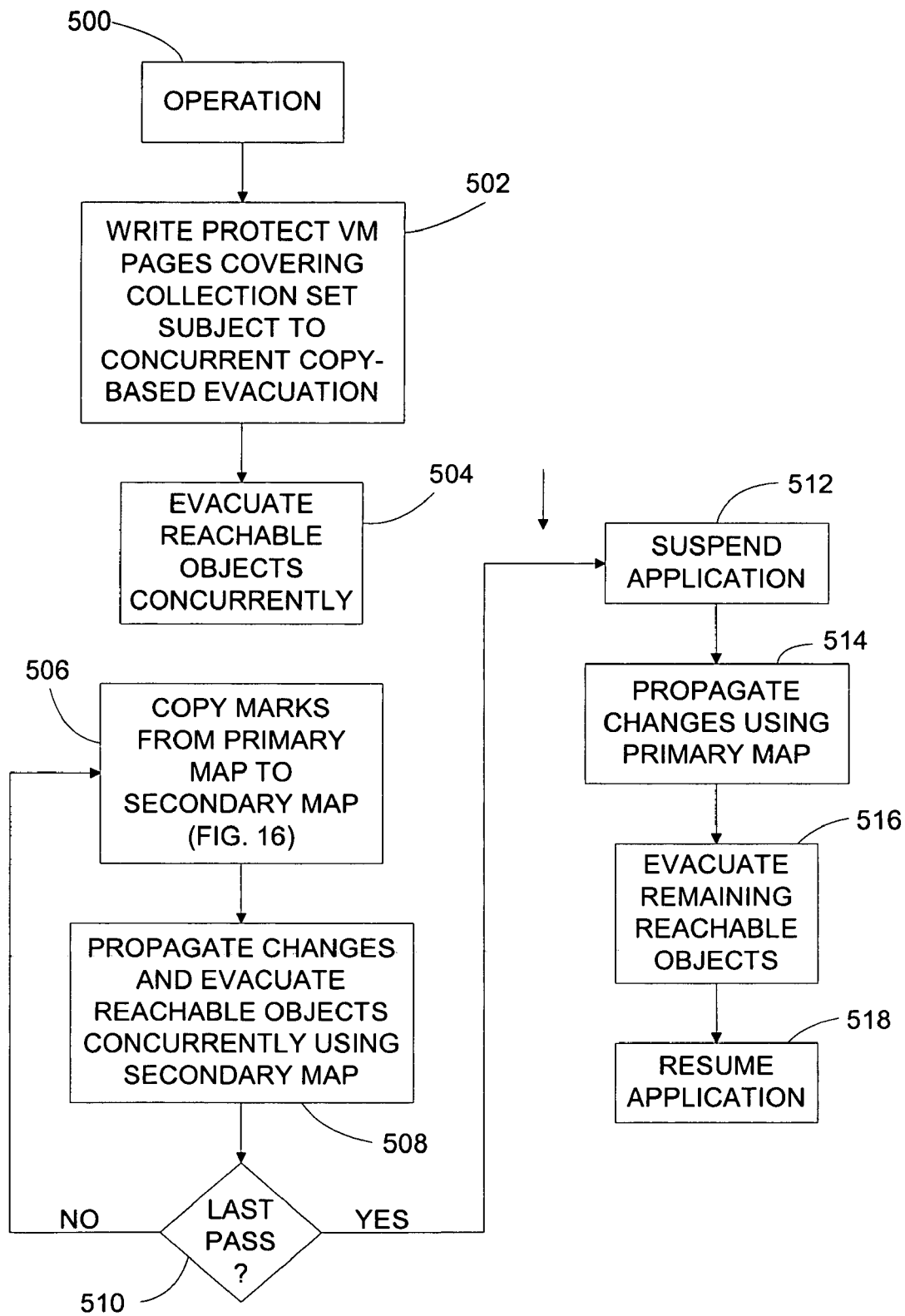
FIG. 15 is a flow chart using two bit maps for concurrent collection refinement.
Figure 16:
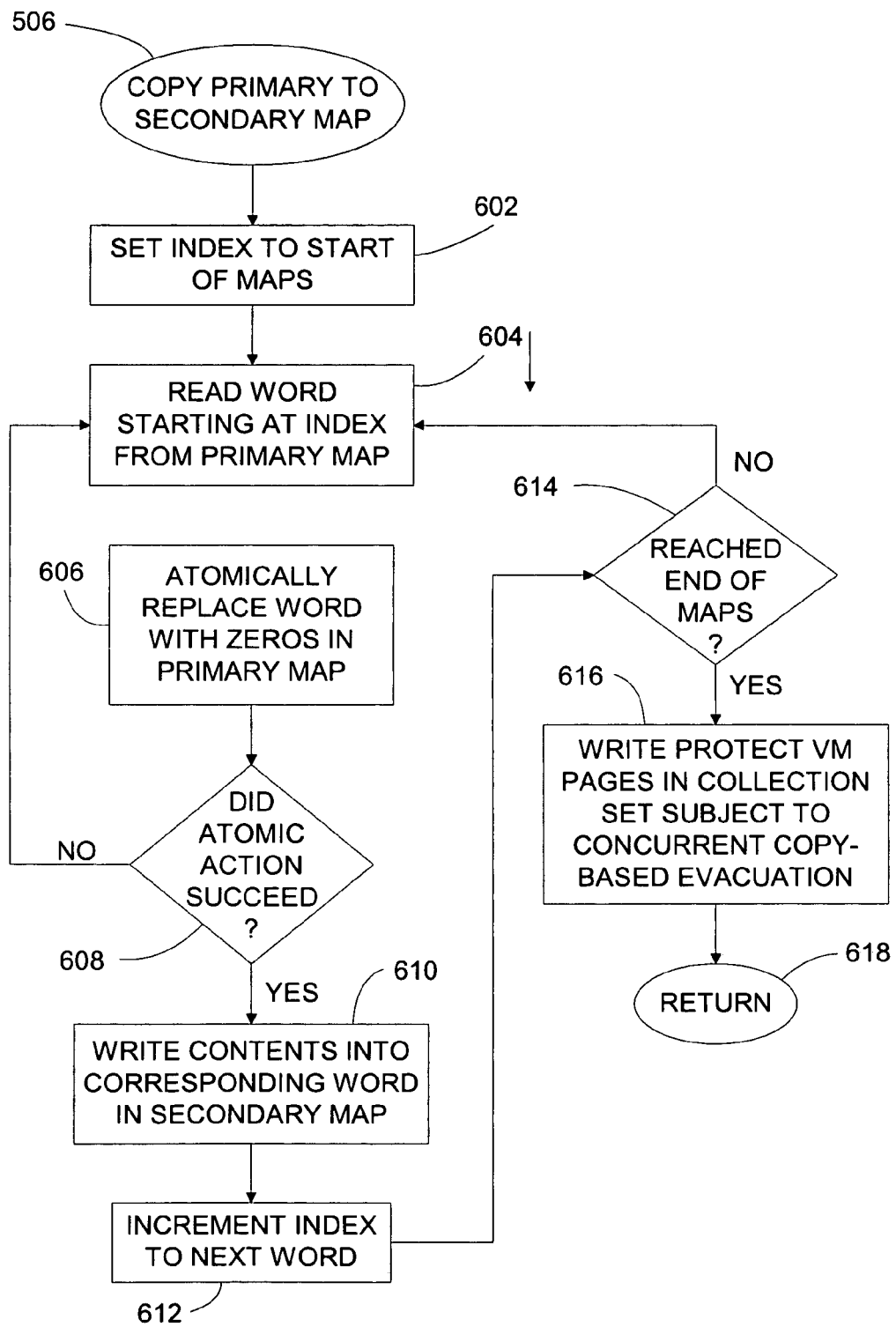
FIG. 16 is a flow chart illustrating copying from one bit map to the other.

In another embodiment, shown in FIGS. 15 and 16, the VM collector and the application can be coordinated by using two maps for concurrent collection refinement. In this approach, the application can still be suspended preferably at the end of the last collection pass. The map that the application's trap handler updates, e.g., map 302 of FIG. 13, can be designated the primary map. The other map, which can be designated as the secondary map, is a copy made of the primary map that can be used for concurrent recopying of modified locations, as described below.

FIGS. 15 and 16 illustrate the concurrent collection operation using a primary and secondary map, as discussed above. With a concurrent collection cycle operating 500, the VM pages covering a collection set subject to concurrent copying-based evacuation can be write protected 502. Reachable objects can be evacuated concurrently 504 with the application operation 400, as shown in FIG. 14. If the primary map contains entries indicating modified pages, some or all of the primary map can be copied 506 to the secondary map. For example, repeatedly modified entries in the first map may be left intact and not propogated to the second map. However, usually the mode of copying the first map to the second map in its entirety can be employed. Referring to FIG. 16, the copying operation of block 506 is illustrated. Operation can begin by setting 602 an index to the start of the maps. The word corresponding with the index can be read 604 from the primary map and the word can be atomically replaced 606 in the primary map with zeros.

The use of an atomic operation at 606 can guarantee that if an operation succeeds, then no intervening store occurs to the given location between the read and the store. In this way, an atomic operation can ensure that recording a VM page that is marked as being modified is not missed. For example, on SPARC® or x86 processors by Sun Microsystems and Intel, respectively, a compare-and-swap operation can be used. For other processors, e.g., PowerPC by IBM and Apple, equivalent functionality can be provided by load-linked/store-conditional operations. An exemplary compare-and-swap operation is provided as follows:

```
compareANDSwap(newValue, oldValue, address) {
    atomically{
        value:=[address];
        if (value==oldValue)
            [address]:=newValue;
        return value;
    }
}
```

If the atomic operation does not succeed, as determined at 608, operation returns to block 604 to read the word from the primary map. If the atomic operation succeeds, the contents read at 604 are written 610 into the corresponding word in the secondary map and the index is incremented 612. If the index is not at the end of the maps, as determined at 614, operation can return to 604 to read the word corresponding to the incremented index. If the end of the maps is reached, the VM pages in the collection set subject to concurrent copy-based evacuation can be write-protected 616 and collector operation continues 618 at FIG. 15.

Referring back to FIG. 15, the changes can be propagated and reachable objects can be evacuated concurrently using the secondary map, as at 508. The operations 506, 508 using the two maps can continue by making a number of passes through the bit maps, as determined at 510. The determination can be made based on one or more of a number of factors, including such factors as reaching a minimum number of pages for each pass, reaching a maximum number of passes, reaching a desired number of modified pages, and/or other factors as may be provided. After the final pass, the application can be suspended 512, the changes can be propagated 514, and the remaining reachable objects can be evacuated 516. The application can resume 518 and concurrent collection can continue 500.

Those of skill in the art can recognize that modifications can be made to enhance the operations described above with respect to FIGS. 15 and 16. For example, write-protecting the VM pages at 616 of FIG. 16 can be performed on a page-by-page basis. In this way, pages that have had their modified flags set in the primary map since a previous pass need not be re-protected. Also, if during concurrent evacuation by way of copying objects out of the collection set, as at 504 or at 508, it is noted that a part of an object is in a VM page that is marked as being modified in either the first or the second map, the operation can skip copying that part of the object. Likewise, the operation can skip recopying modified parts of objects for a given VM page marked as modified in the secondary page when the modified flag is set in the primary map.

What is claimed is:

1. An incremental, concurrent collecting process comprising the steps of:
   defining at least one memory page containing objects,
   creating a map with at least one map entry per memory page,
   write protecting the at least one memory page next to be collected to obtain at least one protected memory page,
   relocating reachable objects found in the at least one memory page,
   in response to a write to the protected memory page occurring in an application, setting a corresponding map entry, and
   unprotecting the at least one protected memory page and making changes corresponding to the write, then
   suspending the application, scanning the map, and propagating the changes to the relocated objects.

2. The collecting process of claim 1, wherein the at least one memory page is a virtual memory page.

3. The collecting process of claim 1, wherein the collecting process employs a train algorithm wherein a collection set defines at least one car and defines a range of memory locations, and further comprising the step of arranging and defining a number of memory pages to overlap the range of memory locations to cover the collection set.

4. The collecting process of claim 3, wherein the at least one memory page is a virtual memory page.

5. The collecting process of claim 4, comprising providing for resuming the application upon propagating the changes.

6. The collecting process of claim 1, comprising providing for resuming the application upon propagating the changes.

7. Electromagnetic signals propagating on a computer network comprising: the electromagnetic signals carrying instructions for execution on at least one processor for the practice of the process of claim 1.

8. Computer readable media, comprising: the computer readable media containing instructions for execution in at least one processor for the practice of the process of claim 1.

9. An incremental, concurrent collecting process comprising the steps of:
   in a mutator:
      in response to a write to a protected memory page occurring in an application, setting a corresponding map entry in a first map, wherein the protected memory page contains objects to be collected,
      unprotecting the protected memory page and making changes corresponding to the write,
   in a collector:
      write protecting at least one memory page next to be collected to obtain the protected memory page,
      relocating reachable objects found in the at least one memory page,
      copying at least a portion of entries set in the first map into a second map,
      scanning the second map, and propagating the changes to the relocated objects,
      performing a scanning pass of the second map for each occurrence of copying entries, suspending the application when at least one criteria for ending scanning passes is met, scanning the first map, and propagating the changes to the relocated objects, relocating remaining reachable objects found in the at least one memory page, and providing for resuming the application.

10. The collecting process of claim 9, wherein copying entries comprises:

setting an index to a start location of the first map, reading a word from the first map beginning at a location corresponding with the index, atomically replacing the word with zeros in the first map, if atomically replacing the word is successful:

writing contents of the reading into a location on the second map corresponding with the index, incrementing the index to a next word of the first map, returning to reading if the index does not correspond with an end of the first map, and re-write protecting the at least one memory page if the index corresponds with the end of the first map, and if atomically replacing the word is not successful:

returning to reading.

11. The collecting process of claim 10, wherein atomically replacing the word comprises guaranteeing that an intervening store does not occur in a part of the word between reading and replacing.

12. The collecting process of claim 10, wherein atomically replacing comprises a compare-and-swap operation.

13. The collecting process of claim 10, wherein write protecting is performed on a page-by-page basis, such that pages not having had a modified flag set in the first map since a previous scanning pass are not re-write protected.

14. The collecting process of claim 10, comprising skipping propagating the changes to one of the relocated objects from scanning the second map, when a portion of the one relocated object is in a memory page marked as being modified.

15. The collecting process of claim 10, comprising skipping recopying modified parts of objects to be relocated for a given protected memory page marked as modified in the second map when a modified flag is set in the first map.

16. The collecting process of claim 9, wherein the criteria for ending the scanning passes comprises at least one of reaching a minimum number of memory pages for each pass, reaching a maximum number of passes, and reaching a desired number of modified memory pages.

17. Electromagnetic signals propagating on a computer network comprising: the electromagnetic signals carrying instructions for execution on at least one processor for the practice of the process of claim 9.

18. A computer readable media, comprising: the computer readable media containing instructions for execution in a processor for the practice of the process of claim 9.

19. An incremental, concurrent collector comprising:

at least one memory page containing objects to be collected, a map with at least one entry per memory page, means for write protecting the at least one memory page next to be collected, a handler, initiated after a write to protected memory occurred in an application, for setting a corresponding map entry indicating the memory page containing the object changed by the write and unprotecting the at least one memory page and making changes corresponding to the write, and means for suspending the application, scanning the map, and propagating the changes to relocated objects.

20. The collector of claim 19 wherein the memory page is a virtual memory page.

21. The collector of claim 19, wherein the collector employs a train algorithm wherein a collection set comprises at least one car and defines a range of memory locations, and further comprising a number of memory pages arranged and constructed to completely overlap the range of memory locations to cover the collection set.

22. The collector of claim 21 wherein the memory page is a virtual memory page.

23. A computer readable media containing instructions for execution of the collector of claim 19 in at least one processor.

24. Electromagnetic signals propagating on a computer network carrying instructions for execution of the collector of claim 19 on at least one processor.

25. An incremental, concurrent collector for collecting a generation comprising:

a mutator comprising:

means for setting, in response to a write to a protected memory page occurring in an application, a corresponding map entry in a first map, wherein the protected memory page contains objects to be collected, means for unprotecting the protected memory page and making changes corresponding to the write, a collector comprising:

means for write protecting at least one memory page next to be collected to obtain the protected memory page, means for relocating reachable objects found in the at least one memory page, means for copying at least a portion of entries set in the first map into a second map, means for scanning the second map, and propagating the changes to the relocated objects, means for performing a scanning pass of the second map for each occurrence of copying entries, means for suspending the application when at least one criteria for ending scanning passes is met, means for scanning the first map, and propagating the changes to the relocated objects, means for relocating remaining reachable objects found in the at least one memory page, and means providing for resuming the application.

26. The collector of claim 25, wherein the means for copying entries comprises:

means for setting an index to a start location of the first map, means for reading a word from the first map beginning at a location corresponding with the index, means for atomically replacing the word with zeros in the first map, means for writing contents of the reading into a location on the second map corresponding with the index, means for incrementing the index to a next word of the first map, and means for re-write protecting the at least one memory page.

27. The collector of claim 25, wherein the criteria for ending the scanning passes comprises at least one of reaching a minimum number of memory pages for each pass, reaching a maximum number of passes, and reaching a desired number of modified memory pages.

28. Electromagnetic signals propagating on a computer network carrying instructions for execution of the collector of claim 25 on at least one processor.

\* \* \* \* \*

UNITED STATES PATENT AND TRADEMARK OFFICE
CERTIFICATE OF CORRECTION

PATENT NO. : 7,653,793 B1 Page 1 of 1
APPLICATION NO. : 10/991148
DATED : January 26, 2010
INVENTOR(S) : Alexander T. Garthwaite It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1414 days.

Signed and Sealed this

Twenty-eighth Day of December, 2010

David J. Kappos
*Director of the United States Patent and Trademark Office*